United States Patent
Henry et al.

(10) Patent No.: US 9,863,798 B2
(45) Date of Patent: Jan. 9, 2018

(54) SYSTEMS AND METHODS FOR MULTIPHASE FLOW METERING ACCOUNTING FOR DISSOLVED GAS

(71) Applicant: Invensys Systems, Inc., Foxboro, MA (US)

(72) Inventors: Manus P. Henry, Oxford (GB); Richard P. Casimiro, North Kingstown, RI (US); Michael S. Tombs, Oxford (GB); Alice Anne Probst, Fullerton, CA (US)

(73) Assignee: Schneider Electric Systems USA, Inc., Foxboro, MA (US)

( * ) Notice: Subject to any disclaimer, the term of this patent is extended or adjusted under 35 U.S.C. 154(b) by 159 days.

(21) Appl. No.: 14/634,521

(22) Filed: Feb. 27, 2015

(65) Prior Publication Data
US 2016/0252380 A1   Sep. 1, 2016

(51) Int. Cl.
*G01F 1/84* (2006.01)
*G01F 1/74* (2006.01)

(52) U.S. Cl.
CPC ............ *G01F 1/8436* (2013.01); *G01F 1/74* (2013.01); *G01F 1/8468* (2013.01)

(58) Field of Classification Search
CPC ......... G01F 1/74; G01F 1/8436; G01F 1/8468
See application file for complete search history.

(56) References Cited

U.S. PATENT DOCUMENTS

| | | | |
|---|---|---|---|
| 5,741,980 A | 4/1998 | Hill et al. | |
| 8,347,733 B2* | 1/2013 | Laird | B01F 5/0619 73/861.28 |
| 8,899,348 B2* | 12/2014 | Henderson | E21B 21/01 166/250.01 |
| 2013/0197808 A1 | 8/2013 | Zuo et al. | |

FOREIGN PATENT DOCUMENTS

| | | |
|---|---|---|
| EP | 0484876 A1 | 5/1992 |
| WO | 9308452 A1 | 4/1993 |
| WO | 0131298 A2 | 5/2001 |
| WO | 2005116637 A2 | 12/2005 |
| WO | 2012027409 A2 | 3/2012 |

OTHER PUBLICATIONS

Partial European Search Report for EP 16157382.9 dated Aug. 2, 2016, 9 pages.

* cited by examiner

*Primary Examiner* — Daniel S Larkin
(74) *Attorney, Agent, or Firm* — Stephen Manetta; Ralph Graham

(57) ABSTRACT

A system for metering flow of a fluid has a vibratable flowtube for receiving a multiphase fluid flow. A driver is configured to vibrate the flowtube. A pair of sensors is positioned to detect movement of the flowtube at different locations on the flowtube. Pressure and temperature sensors are positioned to measure a pressure of the fluid. One or more processors are configured to use a phase difference between the sensor signals to determine a fluid flow rate through the flowtube. The one or more processors are further configured to determine an amount of dissolved gas in the multiphase fluid using the pressure, the temperature, and the relative amounts the multiple liquids in the multiphase fluid.

12 Claims, 23 Drawing Sheets

SYSTEMS AND METHODS FOR MULTIPHASE FLOW METERING ACCOUNTING FOR DISSOLVED GAS

FIELD OF INVENTION

The present invention relates generally to flowmeters and more specifically to Coriolis flowmeters that are adapted to measure multiphase fluids.

BACKGROUND

Various different flowmeters are used in industry to provide information about the flow rate of multiphase fluids. The fluids that are metered can include mixtures of liquids and gases. This situation is commonly encountered in the oil and gas industry, where the fluids produced are commonly a mixture of oil, water, and gas. However, the need to meter multiphase fluids also occurs in other industries as well.

One type of flowmeter is a Coriolis flowmeter. A Coriolis flowmeter includes an electronic transmitter and a vibratable flowtube through which fluid to be metered can be passed. The transmitter maintains flowtube vibration by sending a drive signal to one or more drivers and performs measurement calculations based on signals from a pair of sensors that measure movement of the flowtube. The physics of the device dictate that Coriolis forces act along a section of the flowtube between the sensors, resulting in a phase difference between the generally sinusoidal sensor signals. This phase difference is generally proportional to the mass flow rate of the fluid passing through the measurement section of the flowtube. Thus, the phase difference provides a basis for a mass flow measurement of fluid flowing through the flowtube. The frequency of oscillation of the flowtube of a Coriolis meter varies with the density of the process fluid in the flowtube. The frequency value can be extracted from the sensor signals (for example by calculating the time delay between consecutive zero crossings) so that the density of the fluid can also be obtained by analyzing the sensor signals.

Coriolis meters are widely used throughout various different industries. The direct measurement of mass flow is frequently preferred over volumetric-based metering, for whereas the density and/or volume of a material may vary with temperature and/or pressure, mass is unaffected. This is particularly important in the oil and gas industry, where energy content and hence product value is a function of mass. The term 'Net Oil' is used in the oil and gas industry to describe the oil flow rate within a three-phase or a liquid (oil/water) stream. A common objective in the oil and gas industry is to determine the net oil produced by each well in a plurality of wells because this information can be important when making decisions affecting production from an oil and gas field and/or for optimizing production from an oil and gas field.

The inclusion of gas in a liquid stream introduces errors in the mass flow and density measurements of a Coriolis meter. Laboratory trials can be used to characterize how mass flow rate and density errors relate to other parameters, such as the observed flow rate and observed reduction in density from that of the pure fluid. These trials can be used to develop empirical models that provide corrections to account for some of the error associated with the presence of multiphase fluids including gas and liquid phases. These empirically-based corrections can result in improved performance of Coriolis meters in field operations. Additional details concerning use of a Coriolis meter to meter multiphase fluids are provided in U.S. Pat. Nos. 6,311,136; 6,505,519; 6,950,760; 7,059,199; 7,313,488; 7,617,055; and 8,892,371, the contents of which are hereby incorporated by reference.

The present inventors have made various improvements, which will be described in detail below, applicable to the field of Coriolis flowmeters and applicable to the field of net oil and gas testing.

SUMMARY

One aspect of the invention is a system for metering flow of a fluid. The system has a vibratable flowtube for receiving a multiphase fluid flow. A driver is configured to vibrate the flowtube. A pair of sensors are positioned to detect movement of the flowtube at different locations on the flowtube and output sensor signals indicative of the detected movement. A pressure sensor is positioned to measure a pressure of the multiphase fluid. A temperature sensor is positioned to measure a temperature of the fluid. One or more processors are configured to receive the sensor signals, determine a phase difference between the sensor signals, and use the determined phase difference to determine a fluid flow rate through the flowtube. The one or more processors are further configured to receive a signal from the pressure sensor indicative of the pressure of the multiphase fluid in the flowtube, receive a signal from the temperature sensor indicative of the temperature of the multiphase fluid in the flowtube, receive a signal from a meter indicative of relative amounts of multiple different liquids in the multiphase fluid; and determine an amount of dissolved gas in the multiphase fluid using the pressure, the temperature, and the relative amounts the multiple liquids in the multiphase fluid.

Another aspect of the invention is a system metering flow of a fluid. The system has a vibratable flowtube for receiving a multiphase fluid including multiple liquids and a gas. A driver is configured to vibrate the flowtube. A pair of motion sensors are positioned to detect movement of the flowtube at different locations on the flowtube and output sensor signals indicative of the detected movement. A pressure sensor is positioned to measure a pressure of the multiphase fluid. A temperature sensor is positioned to measure a temperature of the fluid. The system has one or more processors configured to receive a signal from the pressure sensor indicative of the pressure of the multiphase fluid in the flowtube, receive a signal from the temperature sensor indicative of the temperature of the multiphase fluid in the flowtube, receive a signal from a meter indicative of relative amounts of the multiple different liquids in the multiphase fluid, and determine fluid flow rates for each of the multiple different liquids using a mapping between a plurality of inputs and the fluid flow rates of the different liquids. The inputs include a phase difference between the motion sensor signals, a frequency of at least one of the motion sensors signals, the signal from the temperature sensor, the signal from the pressure sensor, and the signal from the meter indicative of the relative amounts of the multiple different liquids. The mapping accounts for solubility of the gas in the multiple different liquids.

Yet another aspect of the invention is a net oil and gas skid for use characterizing the output from one or more petroleum wells. The net oil and gas skid includes a vibratable flowtube for receiving a multiphase fluid from one or more petroleum wells. A driver is configured to vibrate the flowtube. A pair of sensors is positioned to detect movement of the flowtube at different locations on the flowtube and output sensor signals indicative of the detected movement. A temperature sensor is positioned to measure a temperature of the multiphase fluid. A pressure sensor positioned is to measure a pressure of the multiphase fluid. The net oil and gas skid includes a water cut meter adapted to measure relative amounts of oil and water in the multiphase fluid. One or more processors are configured to receive the sensor signals, determine a phase difference between the sensor signals, and use the determined phase difference to determine a fluid flow rate through the flowtube. The one or more processors are further configured to receive a signal from the water cut meter indicative of relative amounts of oil and water in the multiphase fluid, determine a density of the multiphase fluid in the flowtube using the sensor signals; and determine an amount of dissolved gas in the multiphase fluid using the temperature and pressure of the multiphase fluid.

Still another aspect of the invention is a method of metering flow of a multiphase fluid. The method includes vibrating a flowtube while the multiphase fluid flows through the flowtube. A pair of sensors is used to detect movement of the flowtube at different locations on the flowtube. A flow rate is determined based on a phase difference between signals from the sensors. A temperature and pressure of the multiphase fluid are measured. Relative amounts of multiple different liquids in the multiphase flow are measured. An amount of dissolved gas in the multiphase fluid is determined using the temperature and pressure of the fluid.

Another aspect of the invention is a method of determining mass flow rate and density error corrections to compensate for errors associated with flow of a multiphase fluid through a Coriolis meter. The method includes: (i) flowing a multiphase fluid through the Coriolis meter; (ii) using reference meters to measure the amount of liquid and total gas in the multiphase fluid; and (iii) recording the response of the Coriolis meter to the multiphase fluid. The composition of the multiphase fluid is changed by changing the relative proportions of gas and liquid in the multiphase fluid and steps (i)-(iii) are repeated to generate empirical data characterizing the response of the Coriolis meter to multiphase fluid. A gas solubility model is used to determine how much of the total gas was in the form of free gas as the multiphase fluid flowed through the Coriolis meter. The response of the Coriolis meter is mapped to the amount of free gas in the multiphase fluid as determined by the gas solubility model to obtain the mass flow rate and density corrections.

Other objects and features will be in part apparent and in part pointed out hereinafter.

BRIEF DESCRIPTION OF THE DRAWINGS

Corresponding reference numbers indicate corresponding parts through the drawings.

DETAILED DESCRIPTION

Figure 1:
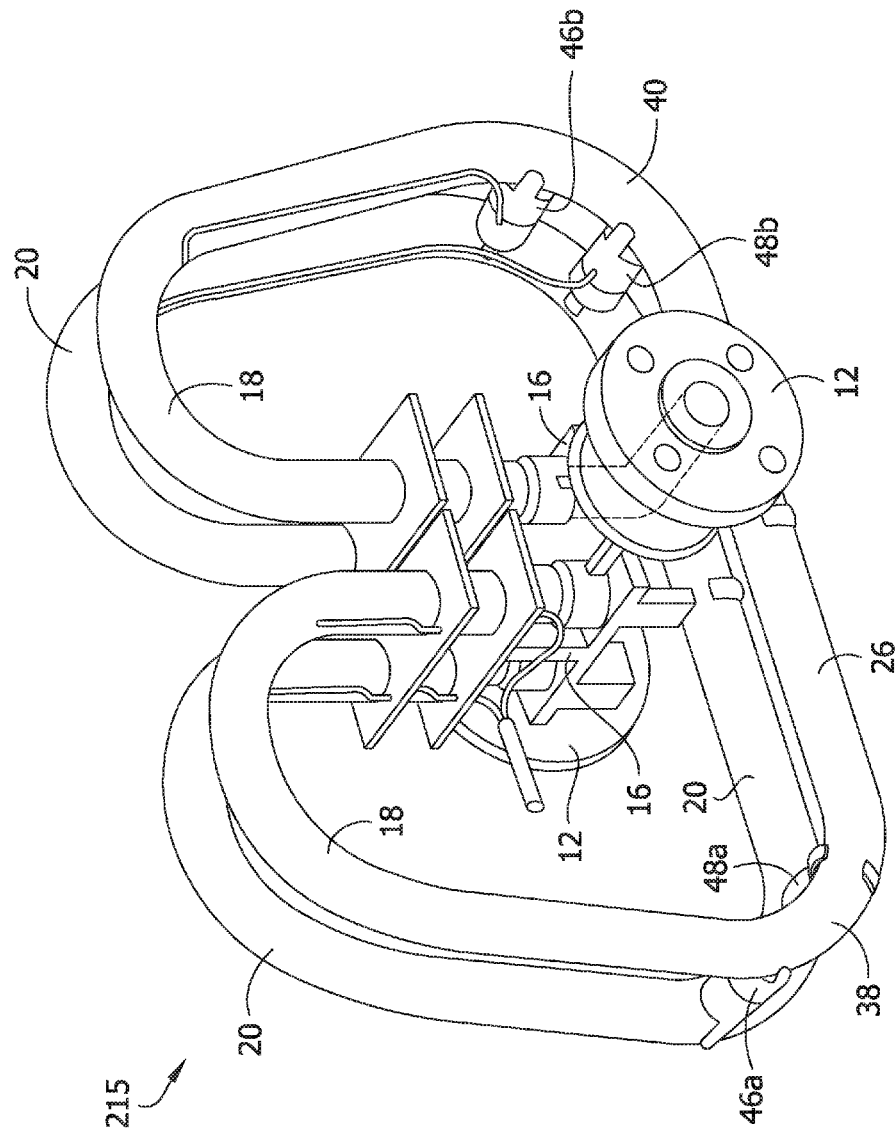
FIG. 1 is a perspective of one embodiment of a Coriolis flowmeter.
Figure 2:
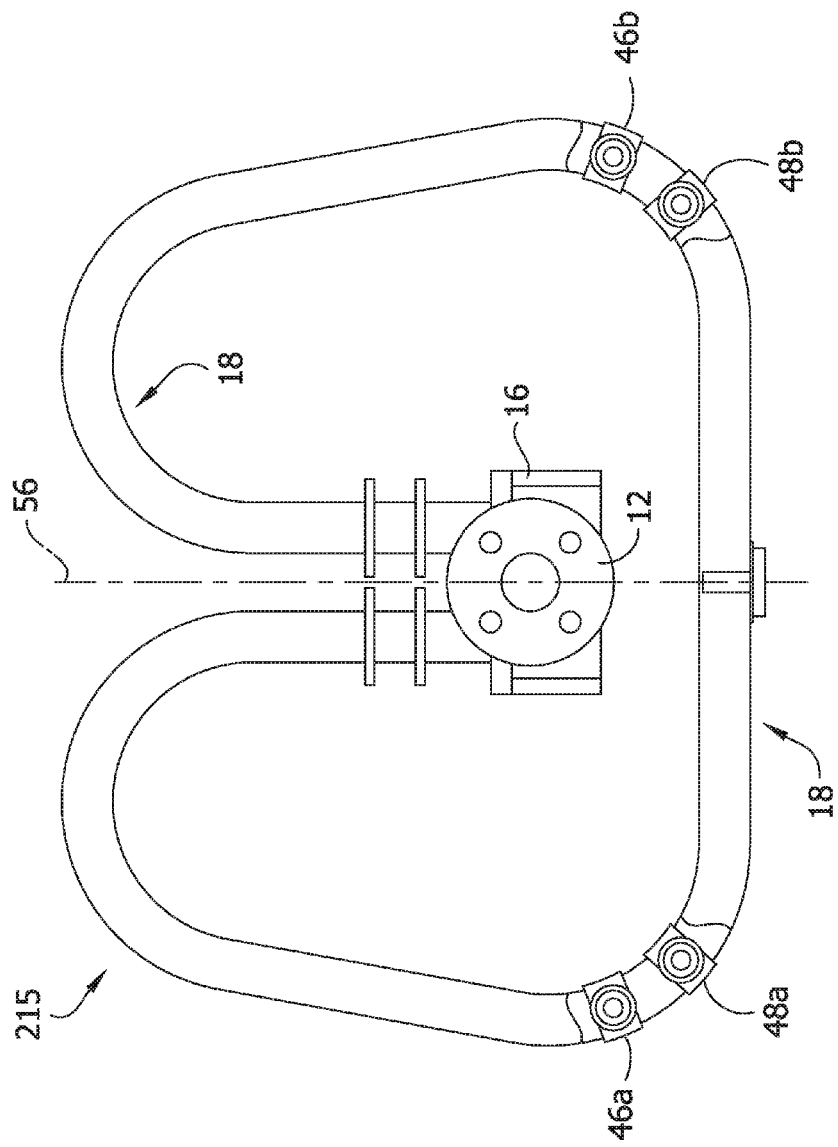
FIG. 2 is a side elevation of the Coriolis flowmeter shown in FIG. 1.

One embodiment of a Coriolis flowmeter, generally designated 215, is illustrated in FIGS. 1 and 2. The flowmeter 215 includes one or more conduits 18, 20 (also referred to as a flowtube), one or more drivers 46a, 46b for driving oscillation of the conduit(s), and a pair of motion sensors 48a, 48b that generate signals indicative of the oscillation of the conduit(s). In the illustrated embodiment, there are two conduits 18, 20, two drivers 46a, 46b, and two motion sensors 48a, 48b, and the drivers and motions sensors are positioned between the conduits so each driver and motion sensor is operable for both of the conduits. It is understood, however, that a Coriolis flowmeter may have only a single conduit and/or may have a single driver. It is also understood the conduit(s) may have different configurations than the conduits 18, 20 in the illustrated embodiment.

As illustrated in FIGS. 1 and 2, the flowmeter 215 is designed to be inserted in a pipeline (not shown) having a small section removed or reserved to make room for the flowmeter. The flowmeter 215 includes mounting flanges 12 for connection to the pipeline, and a central manifold block 16 supporting the two parallel planar loops 18 and 20 which are oriented perpendicularly to the pipeline. The drivers 46a, 46b and sensors 48a, 48b are attached between each end of loops 18 and 20. The drivers 46a, 46b on opposite ends of the loops 18, 20 are energized by a digital controller (not shown) with current of equal magnitude but opposite sign (i.e., currents that are 180° out-of-phase) to cause straight sections 26 of the loops 18, 20 to rotate about their co-planar perpendicular bisector 56 (FIG. 2). Repeatedly reversing (e.g., controlling sinusoidally) the energizing current supplied to the drivers 46a, 46b causes each straight section 26 to undergo oscillatory motion that sweeps out a bow tie shape in the horizontal plane about the axis 56 of symmetry of the loops. The entire lateral excursion of the loops 18, 20 at the lower rounded turns 38 and 40 is small, on the order of $\frac{1}{16}$ of an inch for a two foot long straight section 26 of a pipe having a one inch diameter. The frequency of oscillation is typically about 80 to 90 Hertz, although this can vary depending on the size and configuration of the flowtube(s).

Figure 3:
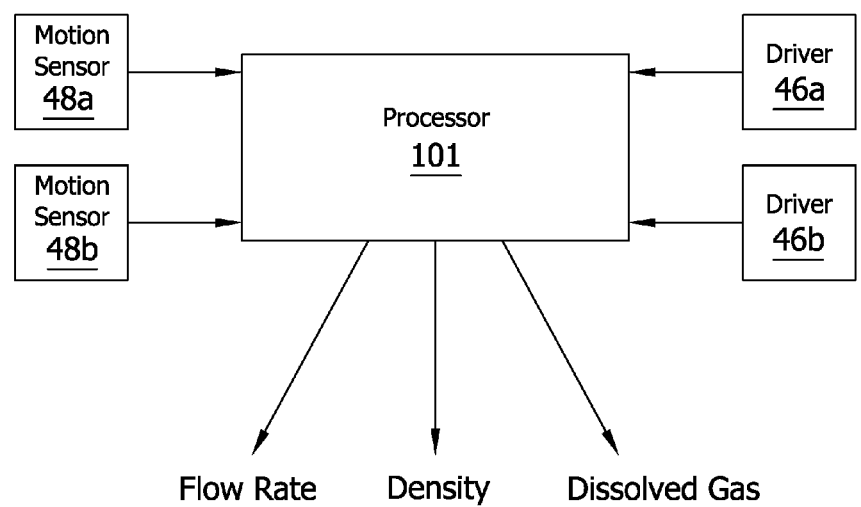
FIG. 3 is a schematic diagram of one embodiment of a Coriolis flowmeter processor showing its inputs and outputs.

The sensors 48a, 48b are positioned to detect movement of the flowtube at different locations on the flowtube and output sensor signals indicative of the detected movement. As will be understood by those skilled in the art, the Coriolis effect induces a phase difference between the two sensors 48a, 48b that is generally proportional to mass flow rate. Also, the resonant frequency of the loops 18, 20 will vary as a function of density of the fluid flowing therethrough. Thus, the mass flow rate and density can be measured by analyzing the signals from the sensors 48a, 48b. The Coriolis meter 215 has a processor 101 (FIG. 3) configured to receive the sensor signals from the sensors 48a, 48b, determine a phase difference between the sensor signals, and use the determined phase difference to determine a fluid flow rate through the flowtube. The processor 101 is also configured to determine a frequency of one or more of the sensor signals and use the determined frequency to determine a density of the fluid in the flowtube.

Various corrections can be applied to the basic measurements resulting from the phase difference between the signals from the sensors 48a, 48b and the frequency. For example, multiphase flow introduces highly variable damping on the flowtube, up to three orders of magnitude higher than in single phase conditions. In addition, the mass flow and density measurements generated under multiphase flow conditions are subject to large systematic and random errors, for which correction algorithms can be defined and implemented by the processor 101. Further details concerning operation of Coriolis flowmeters are provided in U.S. Pat. Nos. 6,311,136; 6,505,519; 6,950,760; 7,059,199; 7,188, 534; 7,614,312; 7,660,681; and 7,617,055, the contents of which are hereby incorporated by reference.

As will be described in more detail below, the processor 101 is suitably configured to apply corrections that account for the influence of dissolved gas on the measurements from the Coriolis meter. Moreover, the processor 101 is suitably configured to determine the amount of dissolved gas in the fluid flowing through the flowtube. The ability to account for the effects of dissolved gas and/or measure the amount of dissolved gas can be important in many different types of industries.

One important industry in which dissolved gas is a concern is the oil and gas industry. Typically, high pressure within an oil reservoir results in much or all of the gas being dissolved within the oil phase. Above the bubble point pressure all of the gas is dissolved. As pressure of the petroleum fluid is reduced with each stage of the extraction process, the gas phase is increasingly released from the oil phase to become free gas. However, the oil phase typically remains saturated with dissolved gas, the quantity of which varies with the pressure and temperature conditions as well as the miscibility of the particular oil and gas concerned. Thus, there is a mass exchange between the free gas phase and the dissolved gas phase as temperature and pressure conditions vary throughout the extraction process. The standard in the oil and gas industry is to report flow rates at standard temperature and pressure conditions in order to provide consistent measurements regardless of the operating conditions. At standard conditions, almost all gas is free gas and there is substantially no dissolved gas.

However, dissolved gas is largely invisible to Coriolis meters, to a first approximation. If a liquid with dissolved gas but no free gas is passed through a Coriolis meter, the following is observed:

(i) The density of the liquid including dissolved gas is close to that of the pure liquid with no dissolved gas. Standard oil industry models exist for predicting the change in density associated with dissolved gas, which is typically a reduction in value, and which is often referred to as the expansion factor. This change in liquid density is typically small compared to the density of the equivalent mixture of oil and free gas;

(ii) The mass flow of the liquid including dissolved gas is the sum of the mass flow rates for the liquid and gas flows, but at the pressures commonly encountered in the oil and gas industry, the mass of the dissolved gas is likely to be very low compared with the mass of liquid; and (iii) The drive gain (which as used herein means the ratio between the drive current (amp) and the voltage (v) of sensor signals) required to maintain oscillation of the flowtube is an indication of the energy needed to maintain flow tube oscillation. The drive gain is low when pure liquids or pure gases flow through the flowtube, but much higher (typically by two orders of magnitude) when a multiphase fluid is in the flowtube. Even the smallest mixture of free gas with liquid can cause the drive gain to rise rapidly, which makes this a key measurement in detecting of presence of free gas. However, with dissolved gas present but with free gas absent, the drive gain shows no significant rise.

Thus, the mass flow and density measurements from the Coriolis meter are not significantly affected by the presence of dissolved gas because the errors in these measurements are small or negligible compared to those induced by a mixture of the same liquid with the equivalent volume of free gas. Accordingly, conventional Coriolis meters dismiss the effects of dissolved gas as negligible and do not attempt to determine the amount of dissolved gas in the fluid.

Although the presence of dissolved gas in and of itself does not influence the behavior of the Coriolis meter, dissolved gas is actually a source of significant error from Coriolis meters during multiphase flow. This is because corrections to account for the presence of multiple phases in a fluid metered by prior art Coriolis meters predominantly use empirical models. While these models make limited use of physical models such as correcting gas density for pressure and temperature, they do not account for dissolved gas. It has been determined that this can introduce substantial errors in the corrected gas flow rates when applied to conditions where there the solubility of gas in the oil phase is different from what is was when the model data was collected.

The Coriolis meter 215 described herein addresses this problem. The quantity of dissolved gas is modeled or predicted from the known physical properties of the liquid and gas phases, together with the observed temperature and pressure conditions. A number of standard oil industry models provide estimates of gas solubility and the resulting change in the fluid density. One such example is provided in "Correlations for Fluid Physical Property Prediction", M. E. Vasquez and H. D. Beggs, JPT 968-70, June 1980. Another option is to use a black oil model which provides a PVT calculation based on bulk properties of the gas, oil and water phases. This model is practical for oil and gas production applications where the bulk fluid composition can change quickly due to slugging or changes in the operating conditions. A compositional model could be used instead and would be appropriate for applications with constant compositions or on-line compositional measurements, such as medical applications.

The influence of dissolved gas is taken into account during model development, which is typically done on the basis of data collected during laboratory trials. Here a physical model is developed to predict how much gas has dissolved, while only the residual free gas is used in the development of empirical corrections for multiphase behavior in the Coriolis meter and other meters (e.g. a water cut meter). As will be shown, this can produce multiphase models which yield corrections to mass flow and density that are more consistent. The second area where dissolved gas is taken into account is during real-time operation, where an appropriate model of dissolved gas is included so that the total gas flow (free+dissolved) can be estimated and reported by the meter.

Thus, one advantage of the Coriolis meter 215 described herein is that it can provide better flow rate and density measurements during multiphase flow including a miscible gas because of the improvements in its ability to provide corrections to the raw flow rate and raw density measurements during multiphase flow. Another advantage of the Coriolis meter 215 is that it can produce a measurement of dissolved gas, which can make it easier to report flow rates at standard conditions in the oil and gas industry and which can be desirable in other applications as well. It is not necessary for any particular meter to achieve both of these advantages. For example, a meter can provide the improved flow rate and density measurements using the technology described herein without determining and/or without outputting a measurement of dissolved gas, and vice-versa, without departing from the scope of the invention.

Model for Multiphase Flow Corrections

A model is derived from empirical data to enable the Coriolis meter 215 to provide corrections to raw mass flow rate and raw density measurements to account for the effects multiphase flow on the meter. The model is developed by subjecting a Coriolis meter to a range of multiphase flow conditions in order to record and model its mass flow and density errors. The model will be described herein in reference to oil, water, and gas to provide a detailed example, but it is understood the same process can be used with different materials.

A three-phase oil, water, and gas mixture can be specified in a number of ways. One way is to specify the mass flows of the oil, water and gas components. Here the oil and water flows will be stated in kg/s, while the gas flow rate (at the low operating pressures considered here) will be stated in g/s. Another way to specify a three-phase mixture of oil, water, and gas is to specify the total liquid flow rate for oil and water (usually in kg/s), water cut (between 0 percent and 100 percent) and Gas Volume flow Fraction or GVF (from 0 percent up to 50 percent and beyond). When the density of each phase is known along with temperature and pressure conditions and there is no slip between phases it is straightforward to convert from one of these specifications to the other. The first description (mass flows of each phase) can be convenient when specifying the accuracy of final results, while the latter description (liquid flow/water cut/GVF) can be more convenient for describing experimental conditions, particularly during model development. A two-phase flow of gas and pure oil can be considered a specific case of three-phase flow where the water cut is zero. Similarly, a two-phase flow of gas with pure water can be considered as another specific case of three-phase flow where the water cut is 100 percent.

Figure 4:
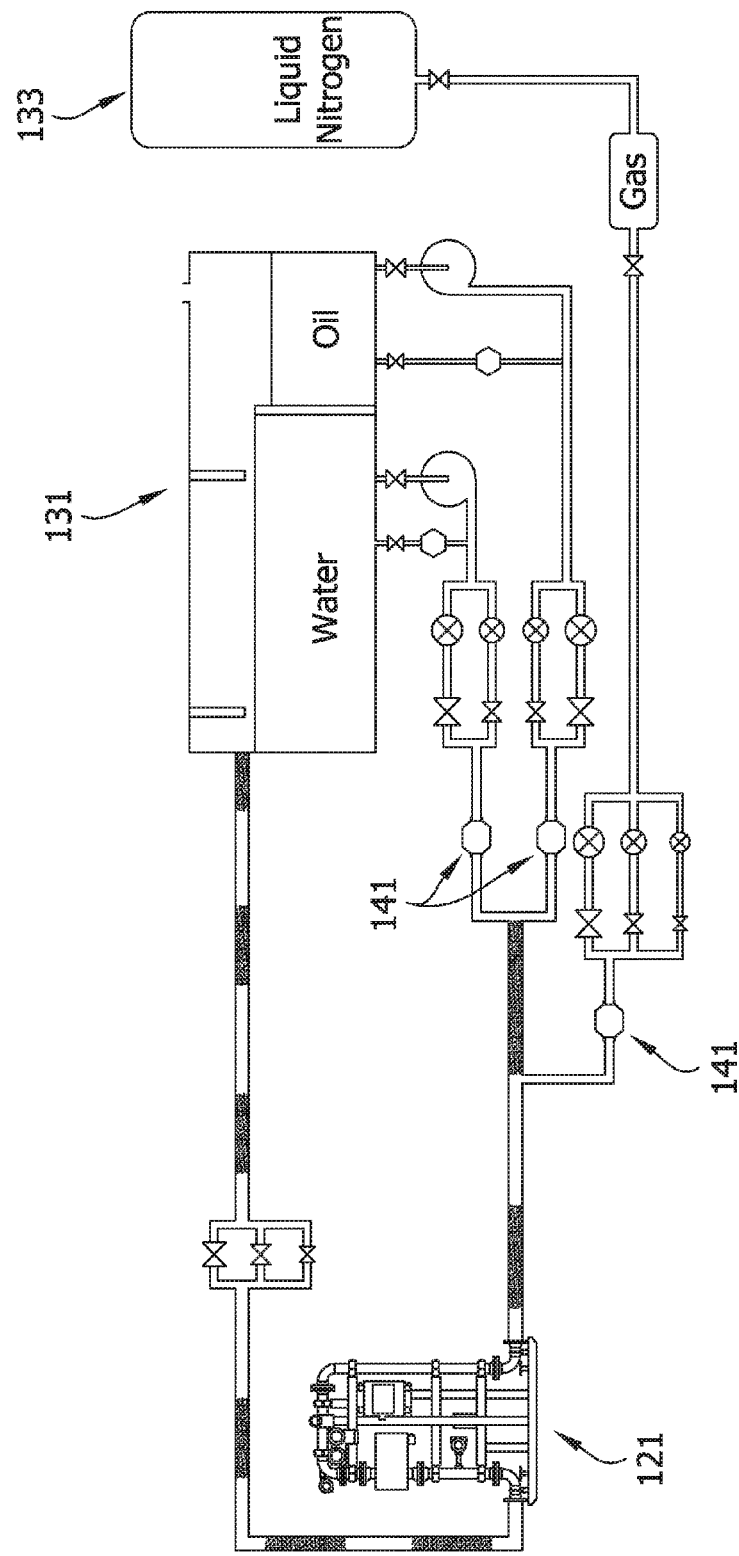
FIG. 4 is a schematic diagram of one embodiment of a system for generating empirical data associated with multiphase flow through the Coriolis meter.

FIG. 4 shows an experimental setup for developing empirical models of Coriolis meter mass flow rate and density errors during multiphase flow. The Coriolis meter under test is integrated into a net oil and gas skid 121, which includes the Coriolis meter 215 illustrated above, along with a pressure sensor positioned to measure a pressure of the fluid in the flowtube, a temperature sensor positioned to measure a temperature of the fluid in the flowtube, and a water cut meter positioned to measure the water cut of the fluid. A separator system 131 provides separated water and oil streams, while a liquid nitrogen tank 133 is used to supply gas that is mixed with the liquids to make a multiphase flow. Each phase is metered separately by one of a set of single phase meters 141, before being combined and passed through the skid 121. For each experiment performed, steady conditions are established for the desired oil, water and gas flow rates, and then the single phase reference measurements from meters 141 are compared with the outputs of the skid 121, averaged over the duration of the experiment.

Figure 5:
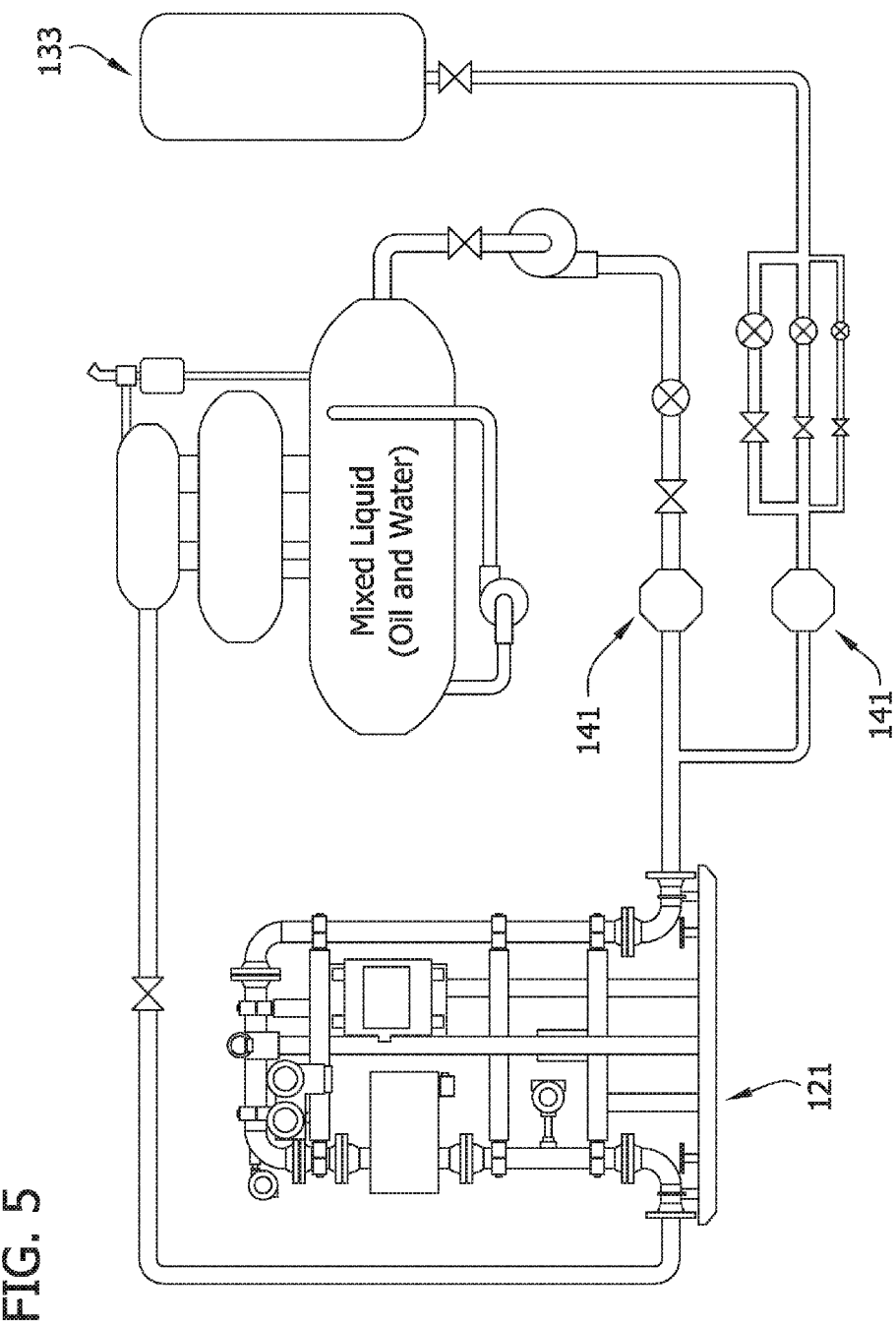
FIG. 5 is a schematic diagram of another embodiment of a system for generating empirical data associated with multiphase flow through the Coriolis meter.

In a simpler alternative arrangement (FIG. 5), there is no separation of oil and water. The water cut is selected in an off-line procedure by replacing a calculated volume of the current oil/water mixture with either pure water or pure oil, depending on whether the water cut is to be increased or decreased. Only if the new water cut is to be 0% or 100% must the entire volume of liquid be replaced. Once the desired water cut has been established, then a series of experiments can be carried out with a range of flowrates and GVF settings, where the water cut is kept constant by continuous mixing of the storage vessel. When a new water cut is required, the off-line procedure is repeated.

Effects of Dissolved Gas in Model Development

In contrast to prior art models developed for Coriolis meters, the calculation of GVF, and of mass flow and density errors, do not rely on the assumption that no gas dissolves into the liquid mixture.

The interaction between the specific oil, water and gas used may result in a proportion of the gas being dissolved in the liquid mixture. However, the solubility of the gas may vary. For example, petroleum gas is more soluble in oil than it is in water, which means the water cut affects the gas solubility relative to the oil/water mixture. In the case of lower water cuts (e.g., pure oil continuous flow, where the mixture/emulsion consists of water droplets in oil) gas can go into solution more easily than it can in the case of higher water cuts (e.g., pure water continuous flow, where the mixture/emulsion consists of oil droplets in water). Little or no gas may go into solution in the event of very high water cuts.

The data in FIGS. 6-13 contrasts the behavior of the same 80 mm diameter Coriolis meter over very similar liquid mass flow and GVF conditions, with and without gas dissolving into the liquid. The pressure for the experiments generating this data was relatively low (300 kPa-500 kPa absolute), which means the gas density can often be considered negligible because it is relatively small compared to the liquid density. The operating temperature was approximately 40° C. It is known that the impact of multiphase mixtures on a Coriolis meter can be reduced where the fluid viscosity is high (the relative movement of gas and liquid within the flowtube is reduced). However, in this experiment the viscosity of the oil was too low to dampen the impact of multiphase flow on the Coriolis meter.

FIGS. 6-9 show, respectively, the drive gain, density drop, mass flow error and density error from a Coriolis meter during an experiment in which water cut was held steady at about 100 percent (i.e., no oil) and gas void fraction was varied by changing the amount of gas mixed with the water. In this experiment very little gas would be able to dissolve into the liquid because of the high water cut and the fact that this particular gas is substantially insoluble in water. In each case the x-axis shows the nominal GVF of the multiphase mixture i.e. the percentage of gas by volume at the pressure and temperature conditions of the Coriolis flowtube, assuming that all the gas injected into the liquid stream remains free, without any gas being dissolved. The default assumption inherent in the prior art is that all gas injected into the liquid, as measured by the reference gas meter, remains as free gas in the multiphase mixture and therefore contributes towards the nominal GVF of the multiphase mixture. In FIGS. 6-9 no distinction is shown between different liquid flow rates, water cuts, or other conditions under which the meter is operated. This data illustrates the expected behavior of a Coriolis meter when free gas is added to a liquid.

The drive gain (FIG. 6) is shown on a logarithmic scale, and indicates the amount of energy required to maintain flowtube oscillation. As various definitions of drive gain may be used, the expression applied here is as follows:

$$\text{drive gain} = (\text{drive current(amps)})/(\text{sensor voltage}(v))$$

There is a considerable spread of drive gain values at zero nominal GVF. Some of this may be caused by marginal quantities of gas still present in the liquid after the reference gas supply has been cut off during a series of experiments. Nevertheless there is a clear gap between the drive gain values at zero and non-zero nominal GVF. With the exception of two points, all non-zero GVF points have higher drive gain than all the zero GVF points. The data suggests very roughly an order of magnitude (i.e. a factor of ten) increase in the drive gain with the onset of any free gas. More generally, while the exact values of the drive gain may vary significantly for different flowmeter designs, flowtube orientations and other factors, a substantial rise in drive gain is commonly observed when free gas mixed with liquid passes through the Coriolis meter.

Figure 7:
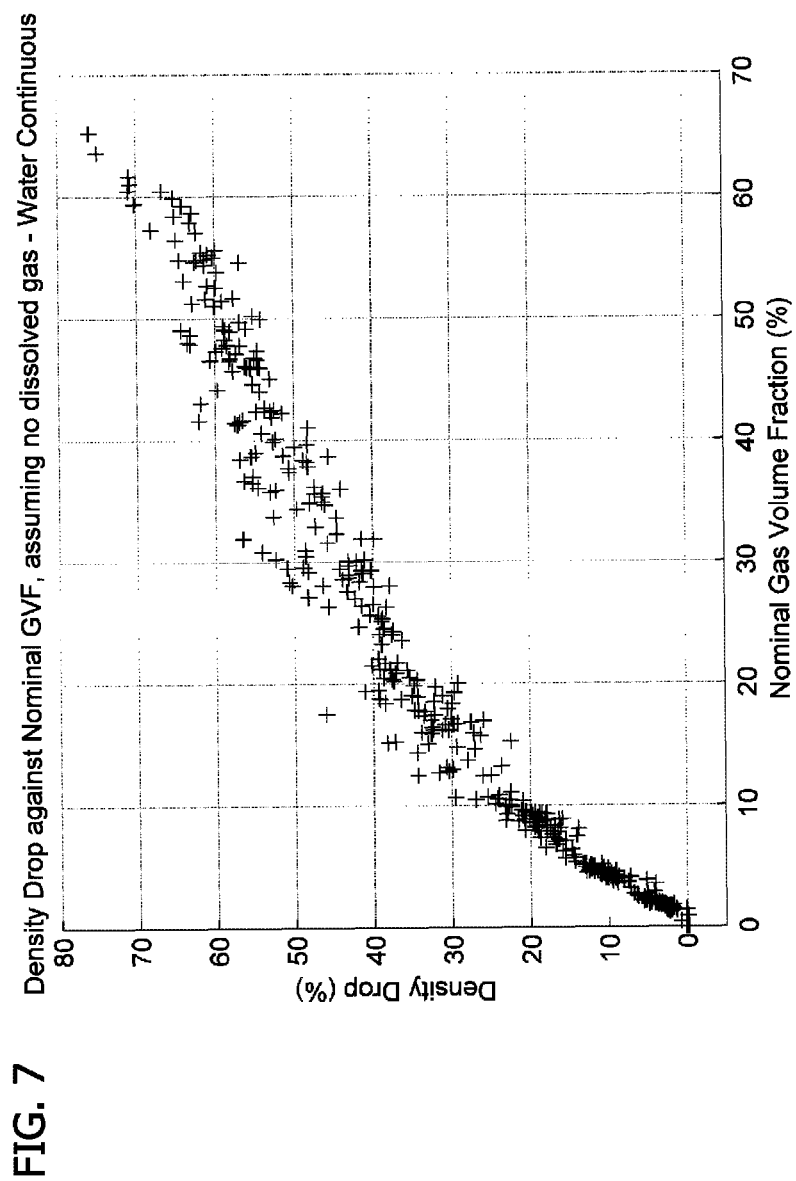
FIG. 7 is a chart plotting density drop vs. nominal gas volume fraction (GVF) for a set of data from a Coriolis meter while metering a mixture of gas and water.

The density drop is shows in FIG. 7. Here the density drop is defined as follows:

$$\text{density drop} = (\rho_f - \rho_a)/\rho_f \times 100 \text{ percent}$$

where $\rho_f$ is the density of the liquid only (note that this may be a mixture of water and oil, depending upon the water cut) and $\rho_a$ is the apparent or observed density generated by the Coriolis mass flow meter. Note that by convention the density drop is shown as positive when the observed density reading falls below that of the fluid density. As expected, the density drop at zero GVF is also zero, but as the GVF increases from zero the density drop rises quickly, indicating that the presence of free gas results in a drop in the observed density reading.

Figure 8:
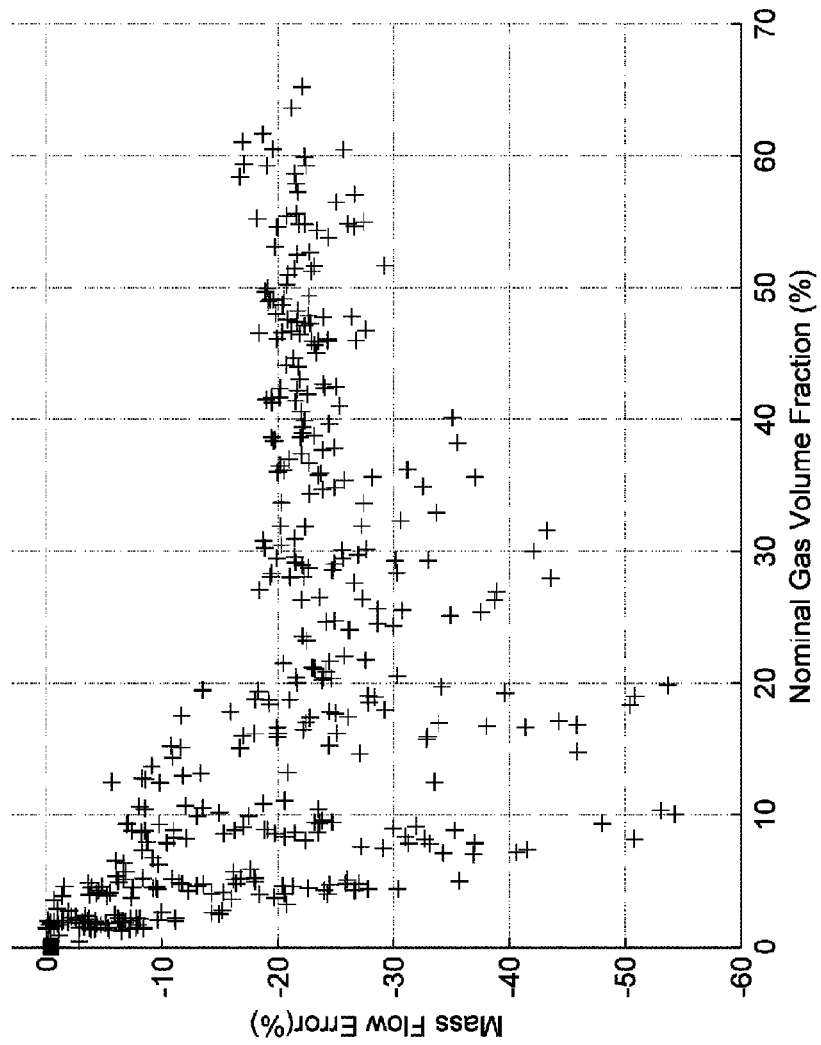
FIG. 8 is a chart plotting mass flow rate error vs. nominal gas volume fraction (GVF) for a set of data from a Coriolis meter while metering a mixture of gas and water.
Figure 9:
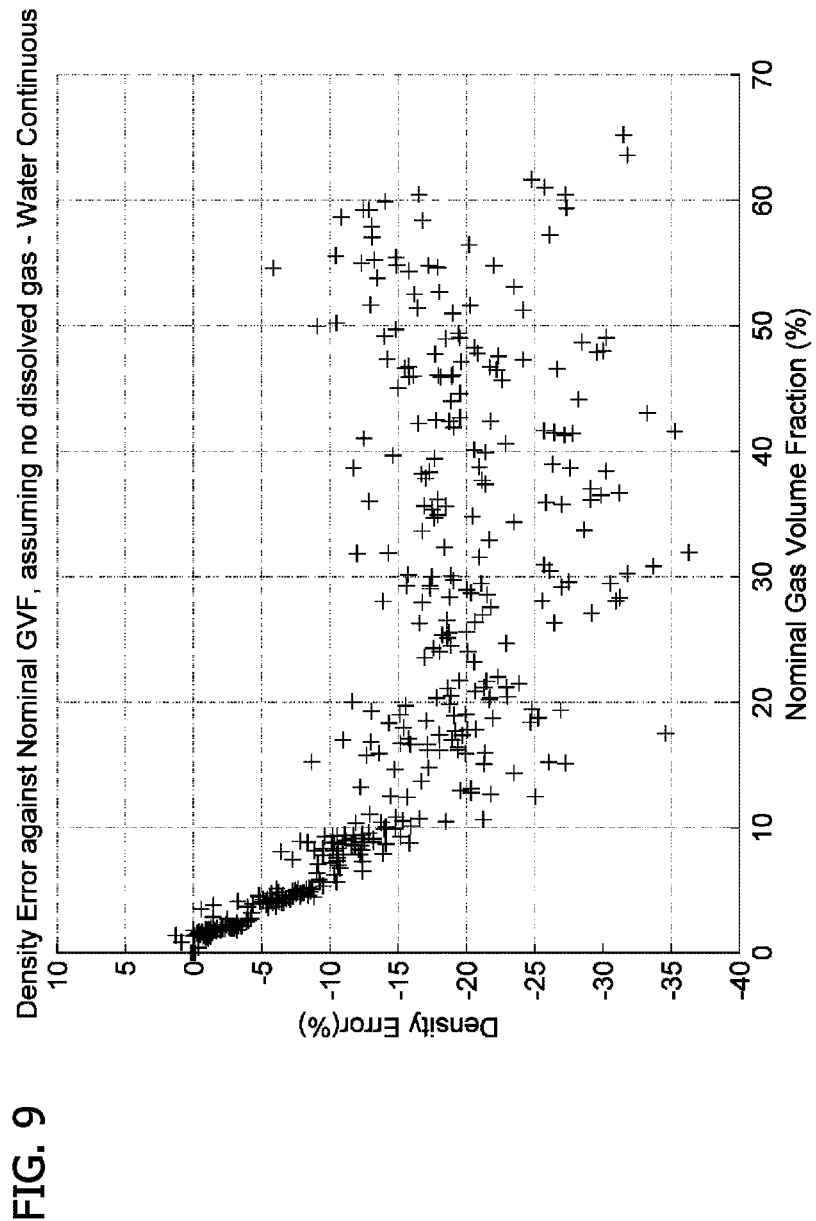
FIG. 9 is a chart plotting density error vs. nominal gas volume fraction (GVF) for a set of data from a Coriolis meter metering a mixture of gas and water.

FIGS. 8 and 9 show the mass flow and density errors for the Coriolis meter, defined as follows:

$$\text{density error} = (\rho_a - \rho_m)/\rho_m \times 100 \text{ percent}$$

$$\text{mass flow error} = (\dot{m}_a - \dot{m}_m)/\dot{m}_m \times 100 \text{ percent } m$$

where $\rho_m$ is the calculated true density of the multiphase mixture, $\dot{m}_m$ is the true mass flow of the multiphase mixture, and $\dot{m}_a$ is the apparent mass flow rate from the Coriolis mass flow meter.

The mass flow and density errors show very broadly similar behavior, starting at zero for zero GVF and dropping rapidly for low but non-zero GVF, before spreading out to form a wider range of errors.

FIGS. 10-13 show the corresponding behavior for drive gain, density drop, mass flow error and density error for the same flowmeter over the same range of GVF and volumetric flow rate, but with low water cut (i.e., oil continuous flow), which results in some of the gas measured by the reference gas meter prior to injection being dissolved into the liquid before reaching the Coriolis meter. In each case the x-axis shows the nominal GVF, assuming all gas measured by the reference gas meter remains free and does not go into solution.

Figure 6:
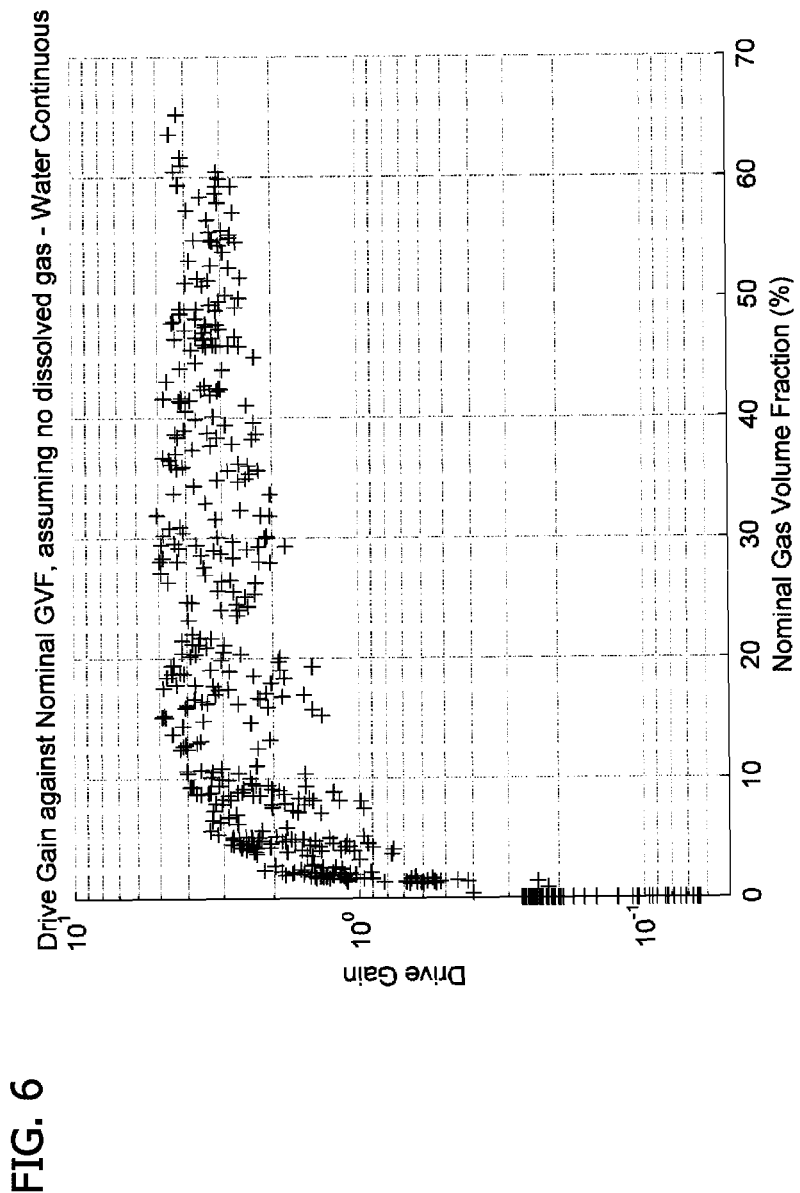
FIG. 6 is a chart plotting the drive gain vs. nominal gas volume fraction (GVF) for a set of data from a Coriolis meter while metering a mixture of gas and water.
Figure 10:
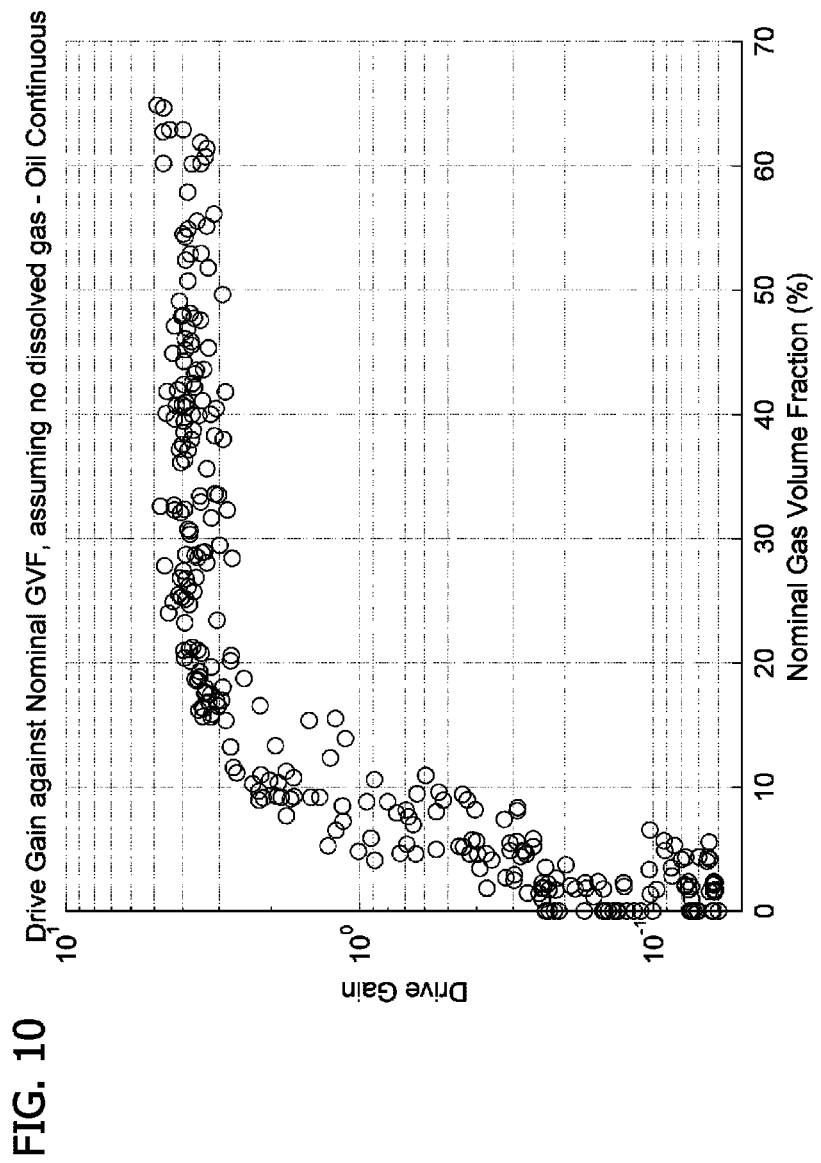
FIG. 10 is a chart plotting the drive gain vs. nominal gas volume fraction (GVF) for a set of data from a Coriolis meter while metering a mixture of gas and oil that causes the actual GVF to differ significantly from the nominal GVF.

In FIG. 10, in comparison with FIG. 6, there is no longer a clear distinction between the drive gain values for zero GVF and slightly above-zero GVF. When the nominal GVF exceeds about 8 percent, however, the drive gain is consistently above the range of values observed at zero GVF. This indicates some of the gas must be going into solution, as the effect of free gas on the drive gain is always significant for low viscosity fluids. In particular, it appears that almost all of the gas goes into solution when the nominal GVF is about 8 percent or less.

Figure 11:
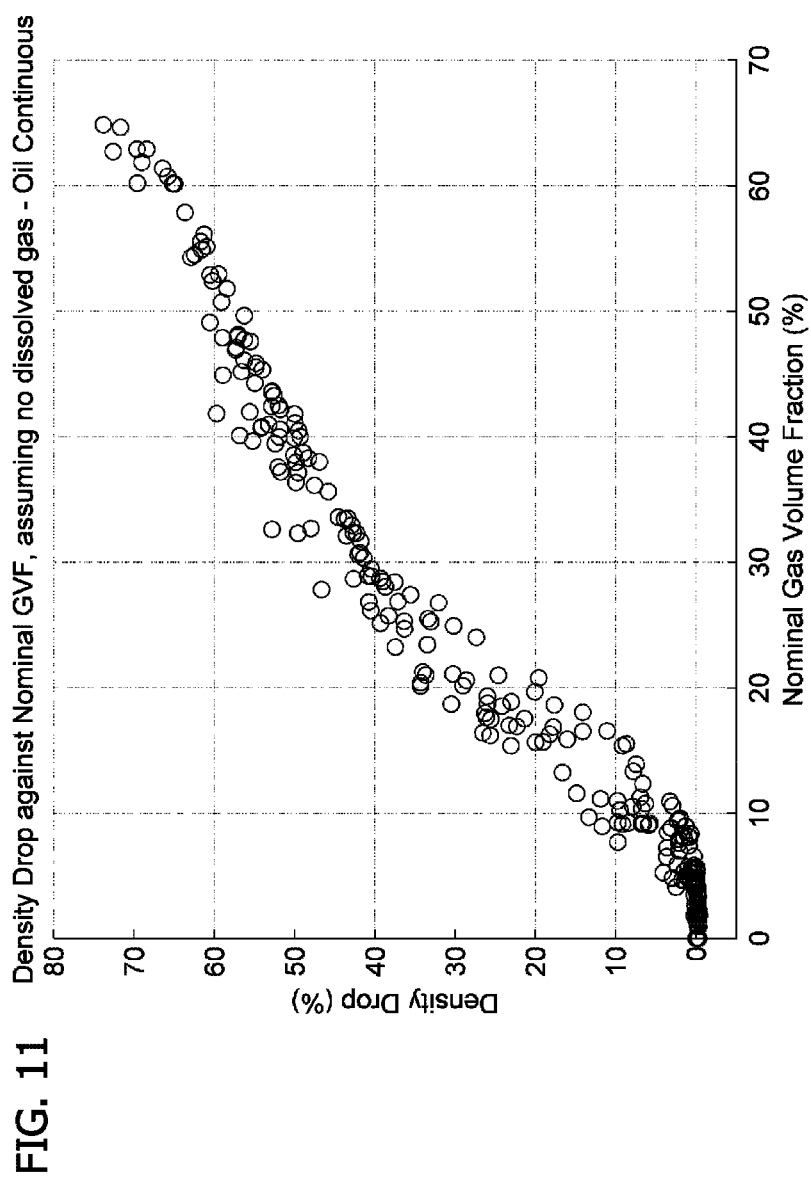
FIG. 11 is a chart plotting density drop vs. nominal gas volume fraction (GVF) for a set of data from a Coriolis meter while metering a mixture of gas and oil that causes the actual GVF to differ significantly from the nominal GVF.

In FIG. 11, (compare with FIG. 7), there is negligible density drop as the nominal GVF increases from 0 percent to about 5 percent. The density drop is not consistently above zero until about 10% nominal GVF. Because the density drop is based on deviation from the pure fluid density, this graph shows that for up to about 5 percent nominal GVF, the reported mixture density is the same as that of the pure liquid. This also indicates at least some of the gas is going into solution.

Figure 12:
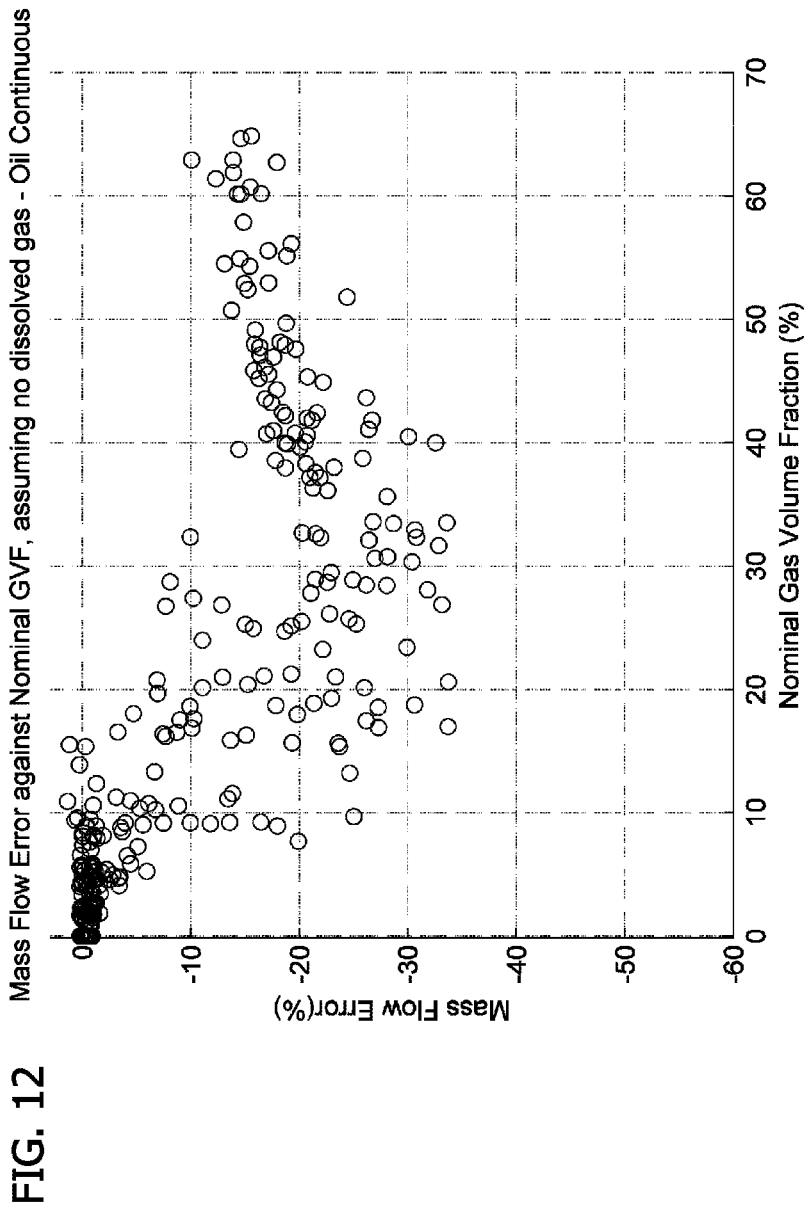
FIG. 12 is a chart plotting mass flow rate error vs. nominal gas volume fraction (GVF) for a set of data from a Coriolis meter while metering a mixture of gas and oil that causes the actual GVF to differ significantly from the nominal GVF.

In FIG. 12, (compare with FIG. 8), the mass flow rate error is close to zero for low nominal GVFs up to about 5 percent, and only when the nominal GVF is in excess of about 15 percent is the corresponding mass flow error consistently less than zero. Again, this indicates some of the gas is going into solution and is not free gas when it flows through the Coriolis meter.

Figure 13:
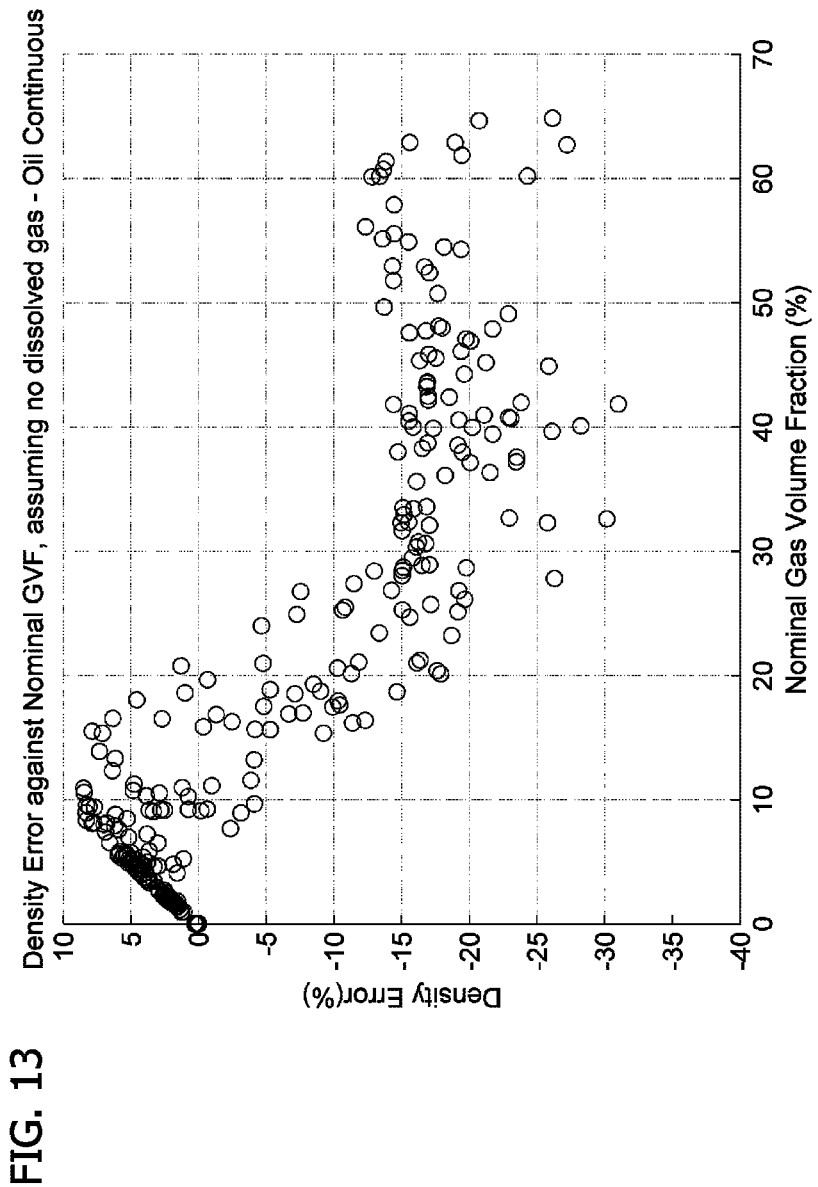
FIG. 13 is a chart plotting density error vs. nominal gas volume fraction (GVF) for a set of data from a Coriolis meter metering a mixture of gas and oil that causes the actual GVF to differ significantly from the nominal GVF.

However, the greatest difference in behavior is shown in the density error (FIG. 13, compare with FIG. 9), where the density error for the liquid/gas mixture is consistently positive for nominal GVFs less than about 8 percent, and density errors are only consistently negative for nominal GVFs above about 20 percent. Clearly, if gas is being dissolved into the liquid this will result in a positive shift in the density measurement compared with a nominal mixture density where it is assumed that all the gas is free. Thus, here again, the results indicate some of the gas is dissolved as it flows through the Coriolis meter.

Overall, the data illustrated in FIGS. 6-13 for this particular set of experiments show a clear difference in the response of the Coriolis meter to, on the one hand, a multiphase flow having near 100 percent water cut, where the gas is substantially immiscible with the liquid and any non-zero nominal GVF has an impact on the behavior of the Coriolis meter (such as increased drive gain and density drop, and negative mass flow and density errors), and on the other a multiphase flow having near 0 percent water cut, where the gas is miscible, and where for nominal GVFs of up to about 5 percent there is limited or no impact on the density drop and mass flow error. In essence, the Coriolis meter simply fails to detect or respond to the presence of gas dissolved in the liquid. Further, the results indicate that the discrepancies between the nominal GVF and the actual GVF during the development of empirically-based mass flow rate and density corrections can introduce error into empirically-based mass flow rate and density corrections developed using experiments that do not address the issues associated with dissolved gas.

Accordingly, to address this issue the quantity of dissolved gas is modeled from the known physical properties of the liquid and gas phases, together with the observed temperature and pressure conditions. A number of oil industry models provide estimates of gas solubility and the resulting change in the fluid density, for example "Correlations for Fluid Physical Property Prediction", M. E. Vasquez and H. D. Beggs, JPT 968-70, June 1980. The results described herein are based on a black oil model which provides a PVT calculation based on bulk properties of the gas, oil and water phases. This model is practical for oil and gas production applications where the bulk fluid composition can change quickly due to slugging or changes in the operating conditions. A compositional model could be used with the same methodologies and would be appropriate for applications with constant compositions or on-line compositional measurements, such as medical applications.

Thus, instead of using nominal GVF when developing empirically-based mass flow rate and density corrections for a Coriolis meter, the level of free gas flowing through the Coriolis meter is calculated based on the reference measurement of total gas flow and the gas solubility model. Then the response of the Coriolis meter to free gas can be modeled better, which results more accurate corrections for mass flow rate and density errors associated with free gas.

Figure 14:
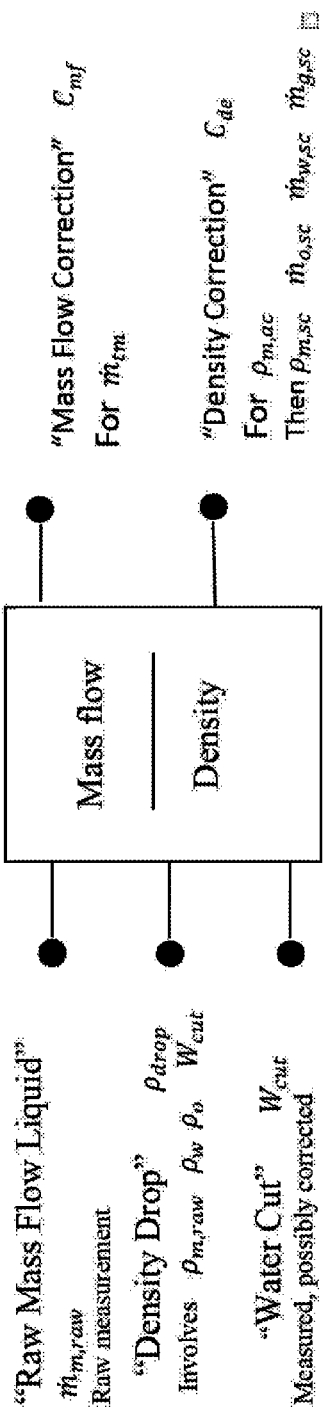
FIG. 14 is a schematic diagram illustrating one embodiment of system for obtaining multiphase flow rate and density corrections for a Coriolis meter.
Figure 15:
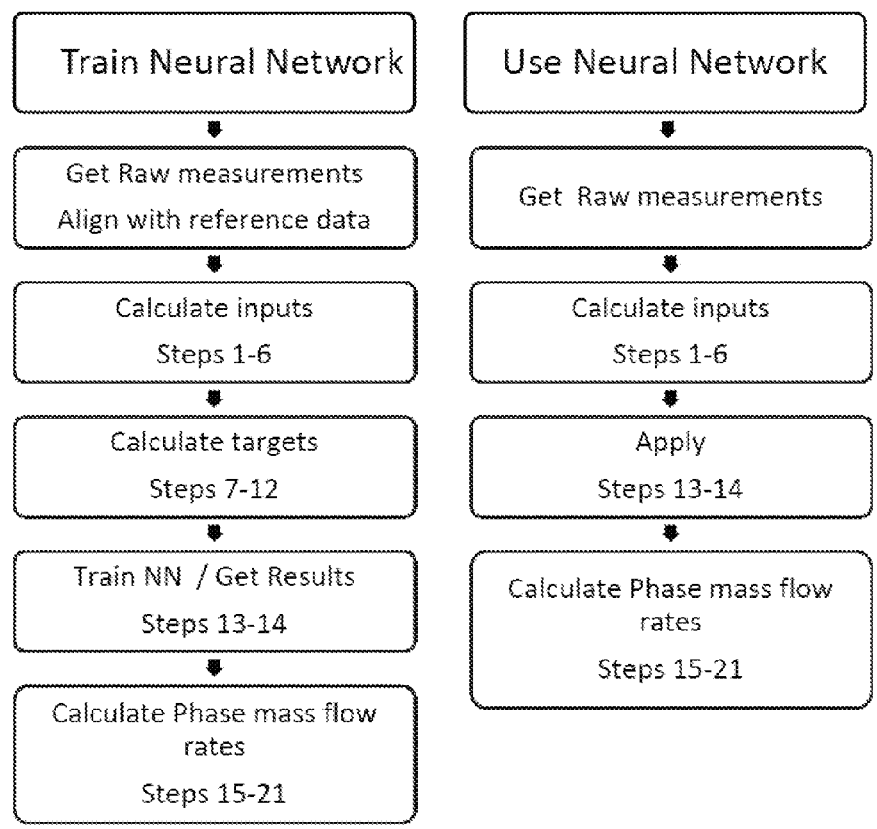
FIG. 15 is a schematic diagram of one embodiment of a method of training and using a neural network to obtain multiphase flow rate and density corrections for a Coriolis meter.

Empirical mass flow rate and density corrections for a Coriolis meter may be implemented in the form of a mapping between a given set of inputs (e.g., phase difference between sensor signals, frequency of flowtube oscillation, temperature, pressure, drive gain, etc.) to a set of outputs (e.g., corrected mass flow rate and corrected density). For example, a neural network can be used. In general the inputs to a neural network are based on data available to the metering system, either through raw measurements or calculations based on these measurements. The inputs are selected to provide a smooth, continuous input in relation to the outputs. A common neural network design for gas-liquid mixtures is shown in FIG. 14. Note that two separate neural networks are used for the mass flow rate correction and the density correction, which is represented in FIG. 14 by the horizontal line in the box for the neural network. One example of a method for training and using this neural network for use with immiscible fluids is outlined in FIG. 15. The equations used in each step are defined in Table 2, which is provided at the end of the detailed description portion of the specification. For immiscible fluids (for example where the liquid is predominately water), the phase mass flow rates are the same for standard and actual conditions.

When gas dissolves in the liquid, the same neural network design can be used in combination with a PVT model. For example, the black oil model uses correlations or tabular data to estimate the amount of dissolved gas and density changes at different temperatures and pressures. The density of the in-situ free gas phase can be determined using the AGA8 model, for example, although other correlations could also be used instead.

Many correlations are available for the black oil model. One example is the Vazquez model. Key parameters in the black oil model are:

$\rho_{o,sc}$, $\rho_{w,sc}$, $\rho_{g,sc}$—standard liquid, gas and water densities used to define the fluids. This is normal input data for the meter. These densities are converted from the meter input standard temperature to 60° F. for use in the correlations.

(ii) GOR, the gas-oil ratio, is a measure of the gas to oil production rates at standard conditions. This is obtained from surface measurements on the separate gas and liquid phases over a period of time.

(iii) $R_s$, the solution gas-oil ratio, accounts for gas that is dissolved in the oil on a volumetric basis. This relationship can be rearranged to predict the bubble point pressure. A free gas phase is present at pressures lower the bubble point pressure. At pressures above the bubble point pressure, the gas is under saturated and the amount dissolved is limited by the GOR.

(iv) $B_o$, the formation volume factor, adjusts the oil density for the dissolved gas. The oil is lighter due to the presence of dissolved gases, even at high pressures.

(v) $R_w$ and $B_w$ are similar factors to account for gas dissolved in water. Gas is far less soluble in water than oil and can usually be neglected in the Coriolis application.

The model suitably includes a gas solubility tuning factor that allows the model to be tuned to account for the fact that actual petroleum fluids do not always behave in the same way. Experiments can be run to improve the tuning of the model for use with a particular set of petroleum fluids. Alternatively, it is sometimes known within the oil and gas industry what tuning factors work well with fluids from a particular oil reservoir or region. The appropriate tuning factors can be input based on this industry knowledge. The tuning factor can be set to a nominal value of 1.0, which matches typical properties of heavy crude oil. When the tuning factor is set to zero, the model becomes an immiscible model. The tuning factor can be configured as a function of water-cut. A commercial physical property calculation package, such as Schneider Electric SimSci™ PIPEPHASE, can be used to obtain full characterization of multiphase phase flow.

Figure 16:
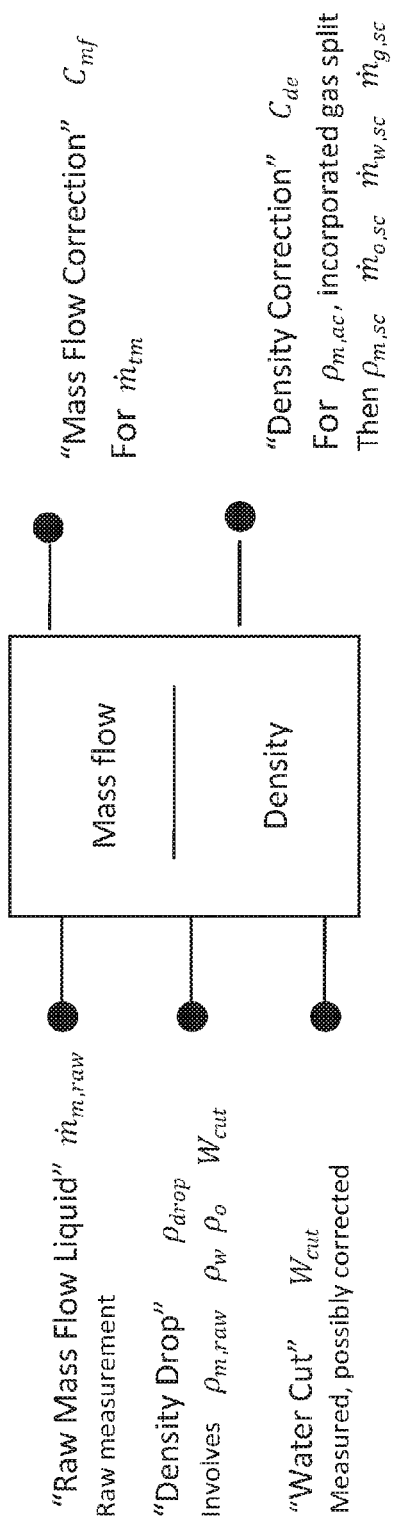
FIG. 16 is a schematic diagram illustrating another embodiment of a system for obtaining multiphase flow rate and density corrections for a Coriolis meter.
Figure 17:
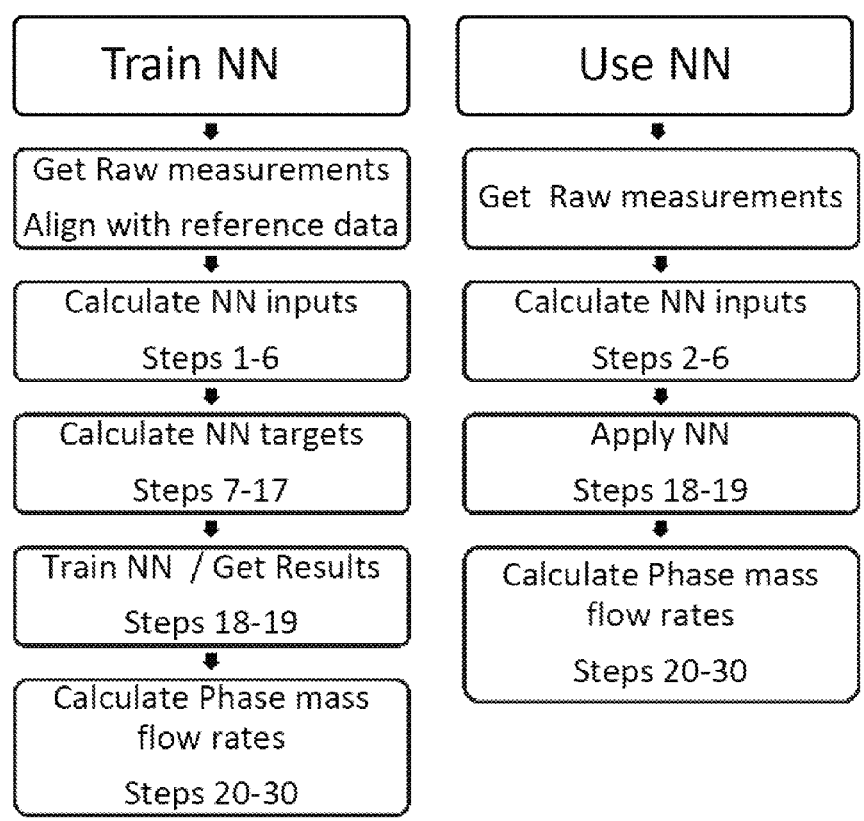
FIG. 17 is a schematic diagram illustrating another method of training and using a neural network to obtain multiphase flow rate and density corrections for a Coriolis meter.

An example of a miscible fluid neural network model is shown in FIG. 16. One example of a method of training and using this neural network is outlined in FIG. 17. The method generally corresponds to the method outlined in FIG. 15, but there are differences associated with inclusion of calculations for dissolved gas. The equations associated with the miscible fluid neural network are listed in Table 3.

Figure 18:
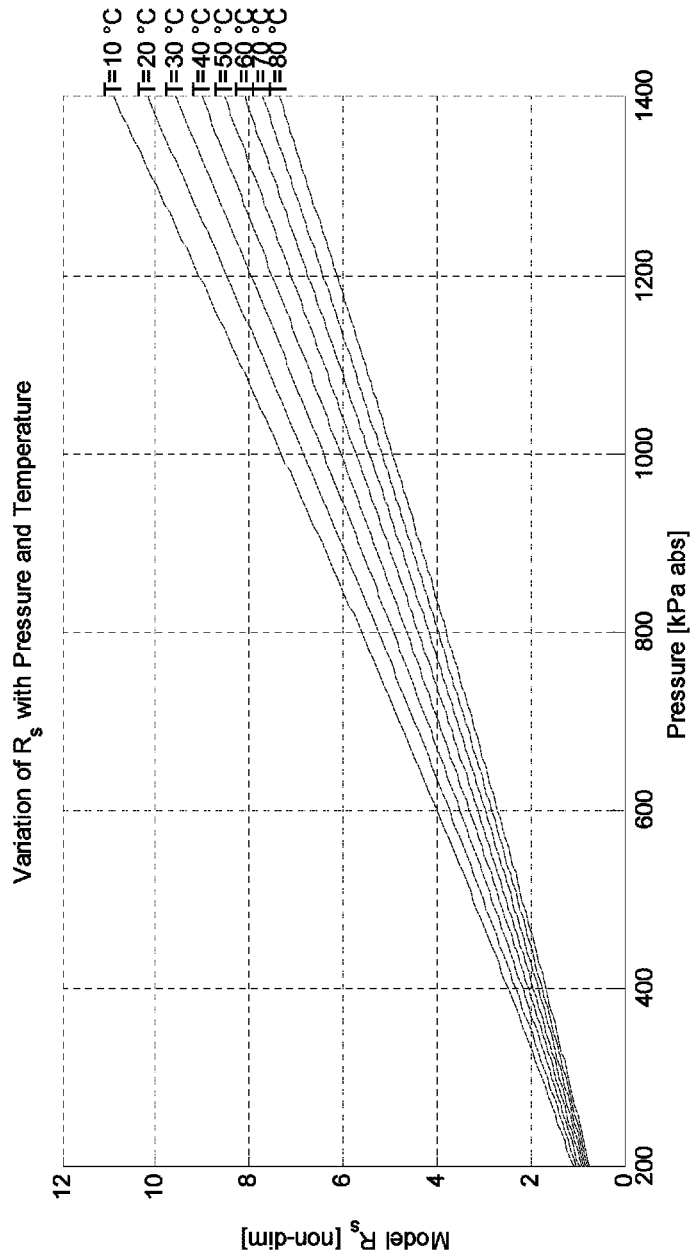
FIG. 18 is a chart showing a relationship between pressure, temperature, and the solution gas-oil ratio ($R_s$)
Figure 19:
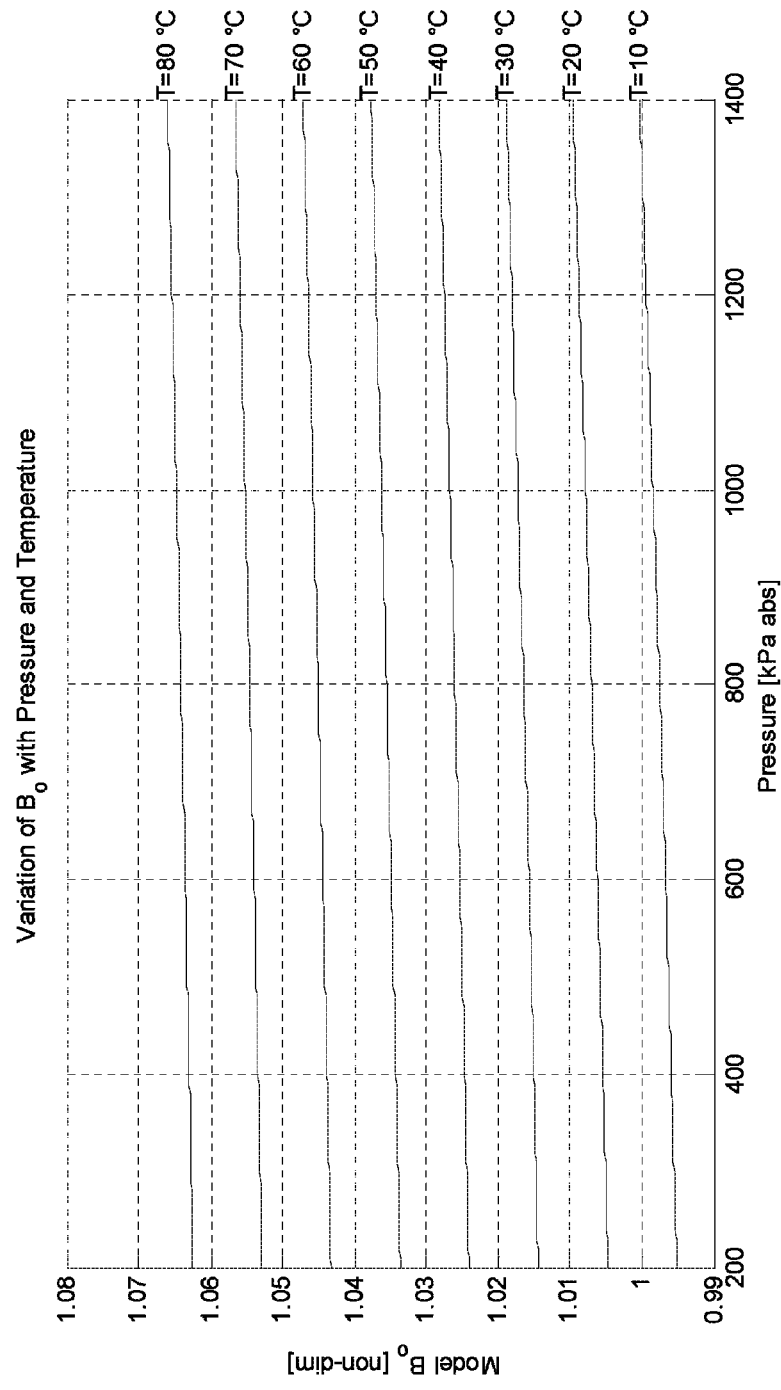
FIG. 19 is a chart showing a relationship between pressure, temperature, and the formation volume factor ($B_o$)

A simplified parametric model or look-up table based on the correlations can be built into an online multiphase flow meter. For an example, FIG. 18 shows curves illustrating the calculated variation with pressure and temperature of the $R_s$ parameter with standard oil and gas densities. These curves show that the amount of dissolved gas increases with increasing pressure, but decreases with increasing temperature. Similarly, as illustrated in FIG. 19, curves can be obtained for $B_o$ as a function of temperature and pressure. After taking into account the tuning factor ($CR_s$)—the gas saturated oil density reduces with increasing temperature and dissolved gas, leading to increasing $B_o$.

The dissolved gas model is suitably used during development of the empirical mass flow rate and density corrections for multiphase flow so that the inputs are more accurate than in conventional techniques. For example, one set of calculations are reproduced in Table 4 at the end of the detailed description. Some things stand out in these example calculations. For example, the liquid densities and GVFs calculated with the benefit of the gas solubility model are significantly different from the nominal values. While the nominal value for liquid density was 830.3 kg/m$^3$, the actual liquid density as estimated with the benefit of the gas solubility model was only 825.3 kg/m$^3$. This is corroborated by the scientific understanding that the inclusion of dissolved gas in the oil will reduce the density of the oil (e.g., from 797.5 kg/m$^3$ to about 791.7 kg/m$^3$ per the data from Table 4). The actual GVF estimated with the benefit of the gas solubility model (11.7 percent) was also much lower than the nominal GVF (18.3) percent. This is consistent with the data in FIGS. 6-13 indicating that at least some of the gas does in fact dissolve into the oil during three-phase flow trials in the laboratory.

Accordingly, the mass flow rate and density corrections for multiphase flow can be improved using the techniques described herein. Thus, the Coriolis meter 215 is suitably configured to determine mass flow rates for oil, water, and/or gas, and/or density using a mapping (e.g., neural network in combination with gas solubility model) that accounts for the effects of dissolved gas. This can result in a Coriolis meter that provides more accurate mass flow rate and/or density readings during multiphase flow.

The data in FIGS. 6-13 was generated using a particular set of multiphase fluids comprised of oil, water and gas from the petroleum industry. It is understood that the effects of dissolved gas can be different when different sets of multiphase fluids are involved in the process. For example, carbon dioxide (CO$_2$) dissolves easily in water, in contrast to gas from petroleum wells. However, the same process can be used to reduce the error associated with dissolved gas by taking the different materials into account when selecting, adapting, and or developing suitable model to account for the presence of dissolved gas.

Application of Dissolved Gas Model in the Field

The preceding sections explain how to improve the accuracy and consistency of a Coriolis meter during multiphase flow. However, it also possible to use a gas solubility model in the field to provide a measure of the amount of dissolved gas in the fluids flowing through the Coriolis meter 215. The gas solubility model used in the field can be the same model used in the laboratory but it could be a different model. The model used in the field could have a different tuning, or even a different structure, than the model for the laboratory. The dissolved gas model most appropriate for a lower pressure laboratory used to develop the Coriolis meter 215 multiphase flow corrections might not be the most appropriate model for on-line operation in a higher pressure upstream application. However, the Coriolis meter's response to free gas should be the same, even though the quantity of any dissolved gas may be different depending on the pressure. This is because, as noted above, the Coriolis meter 215 is not influenced much by the presence of dissolved gas. If desired, the Coriolis meter 215 can be configured so one or more tuning factors can be input or adjusted by a user. This can facilitate deployment of the same Coriolis meter 215, or same type of Coriolis meter, in different oil fields having fluids that behave differently.

One method of applying a gas solubility model in real-time includes the following steps: (i) determine the amount of free gas (GVF) in the multiphase mixture based upon the response of the Coriolis meter; (ii) use the gas solubility model to calculate the amount of dissolved gas; and (iii) calculate the total gas present from the free gas and the dissolved gas. The processor 101 of the Coriolis meter 215 is suitably configured (e.g., programmed) to perform this method and output the amount of dissolved gas and/or total gas. For example, the processor 101 is suitably configured to report the amount (flow rate and/or totalized over time) of oil, water, and total gas (including both free gas and dissolved gas) at standard conditions.

Skid Design

Multiphase flow regimes of (e.g., oil, water, and gas) can present challenges for accurately measuring the flow rates of the liquid and gas components with a Coriolis mass flow meter and Water-Cut meter (measuring water-liquid volume flow ratio at line conditions) metering system. Specifically, variations in the flow regime can create slip conditions where the gas phase velocity can vary significantly from that of the oil and water liquid phase, rendering accurate metering more difficult.

Water-Cut meters operate best with a well-mixed stream of oil and water. When the flow regime includes significant slugging, it can be desirable to prevent Coriolis meters and water cut meters from being subject to positive and then negative flow rates, as might occur if the meter were positioned on the upward leg of a skid. It is also desirable that Coriolis meters are drained properly in zero flow conditions because a partially filled flowtube can create large flow rate and density errors when there is no fluid flowing through the partially filled flowtube.

Figure 20:
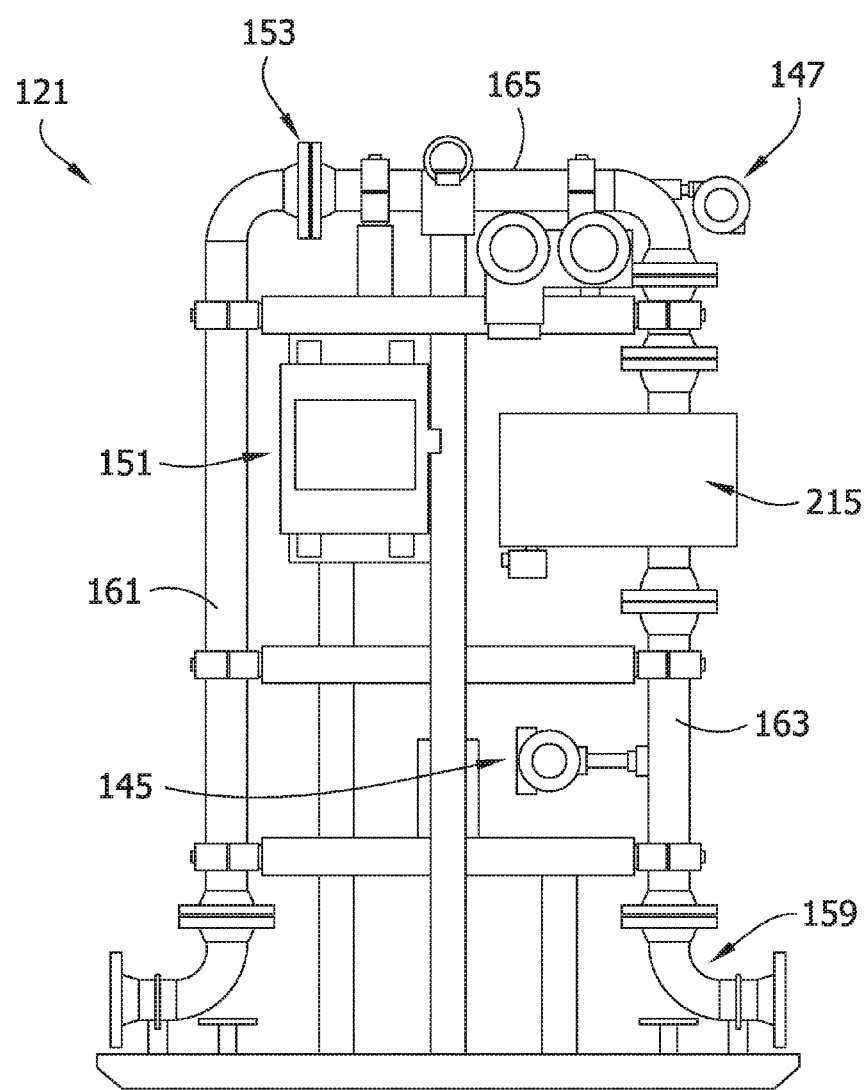
FIG. 20 is a front elevation of one embodiment of a net oil and gas skid including the Coriolis flowmeter of FIGS. 1 and 2.
Figure 21:
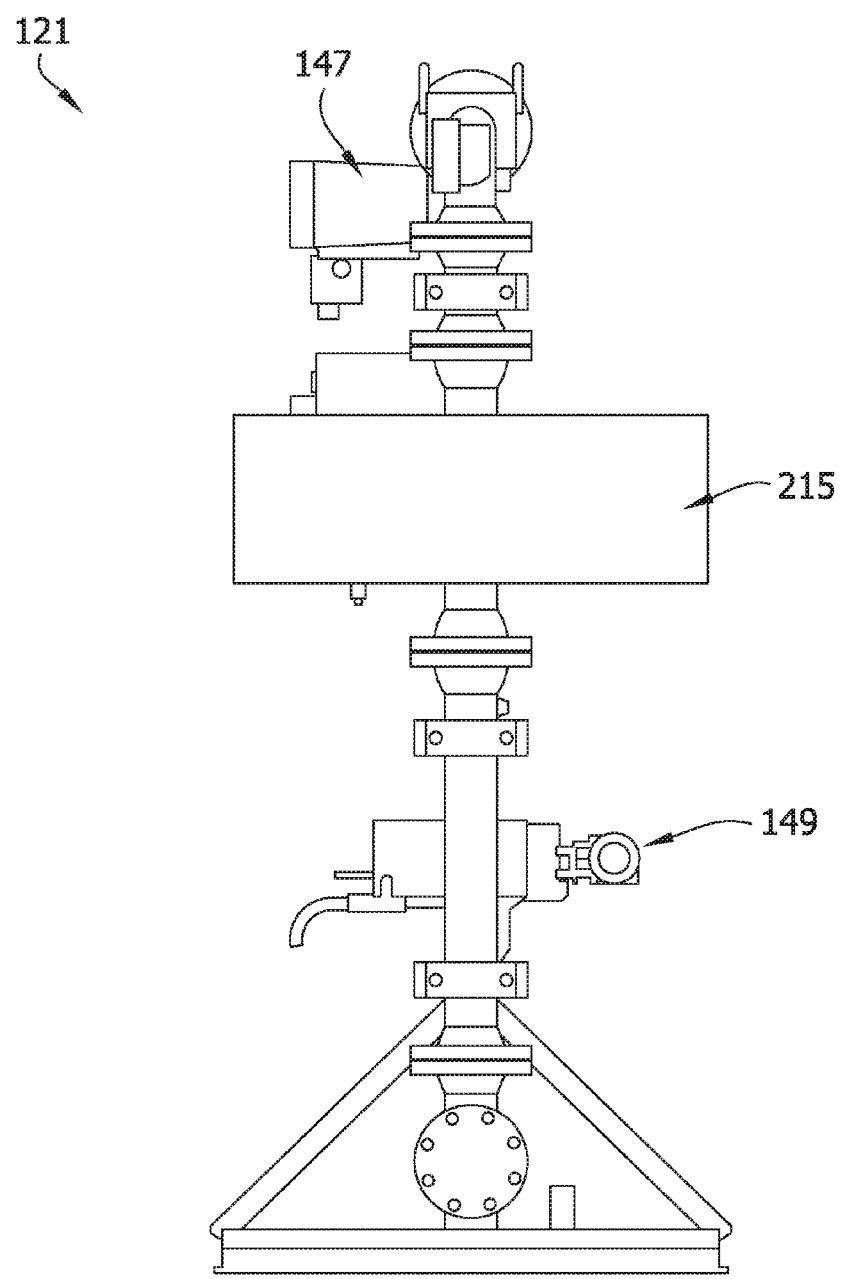
FIG. 21 is a side elevation of the net oil and gas skid shown in FIG. 20.

FIGS. 20 and 21 show a net oil and gas skid 121 (which is a multiphase metering system) designed to minimize the potential slip condition between gas and liquid phases. The net oil and gas skid 121 includes the Coriolis meter 215, a water cut meter 145 positioned to measure the water cut of fluid, a temperature sensor 147 positioned to measure the temperature of the fluid, and a pressure sensor 149 positioned to measure the pressure of the fluid. It can also be desirable to measure differential pressure across the flowtube because this can facilitate performing gas calculations using the average pressure in the flowtube rather than just the pressure at the flowtube entrance, at the flowtube exit, or at some other specific location. A net oil computer 151 (broadly, a processor) is mounted on the skid 121. The net oil computer 151 is configured to receive signals from the Coriolis meter 215, water cut meter 145, temperature sensor 147, and pressure sensor 149, along with any other measurement devices that may be included on the skid 121. The net oil computer 151 suitably integrates information from all of the devices 215, 145, 147, 149, etc. and performs any calculations that have not already been performed by the devices needed to determine flow rate and density of the fluid flowing through the skid 121. The net oil computer 151 suitably outputs current flow rate for oil, water and gas independently of one another. The net oil computer 151 suitably also outputs total flow for oil, water, and gas for one or more time periods. The processing required to operate the Coriolis meter 215 and the net oil computer 151 is suitably performed by one or more processors. For example, some of the calculations may be performed in a transmitter of the Coriolis meter 215 while other calculations are performed in a separate processor. It is understood that there is flexibility in where the various calculations and other processing activities required are carried out and the particular choices described in the embodiment detailed herein should not be considered limiting.

Figure 22:
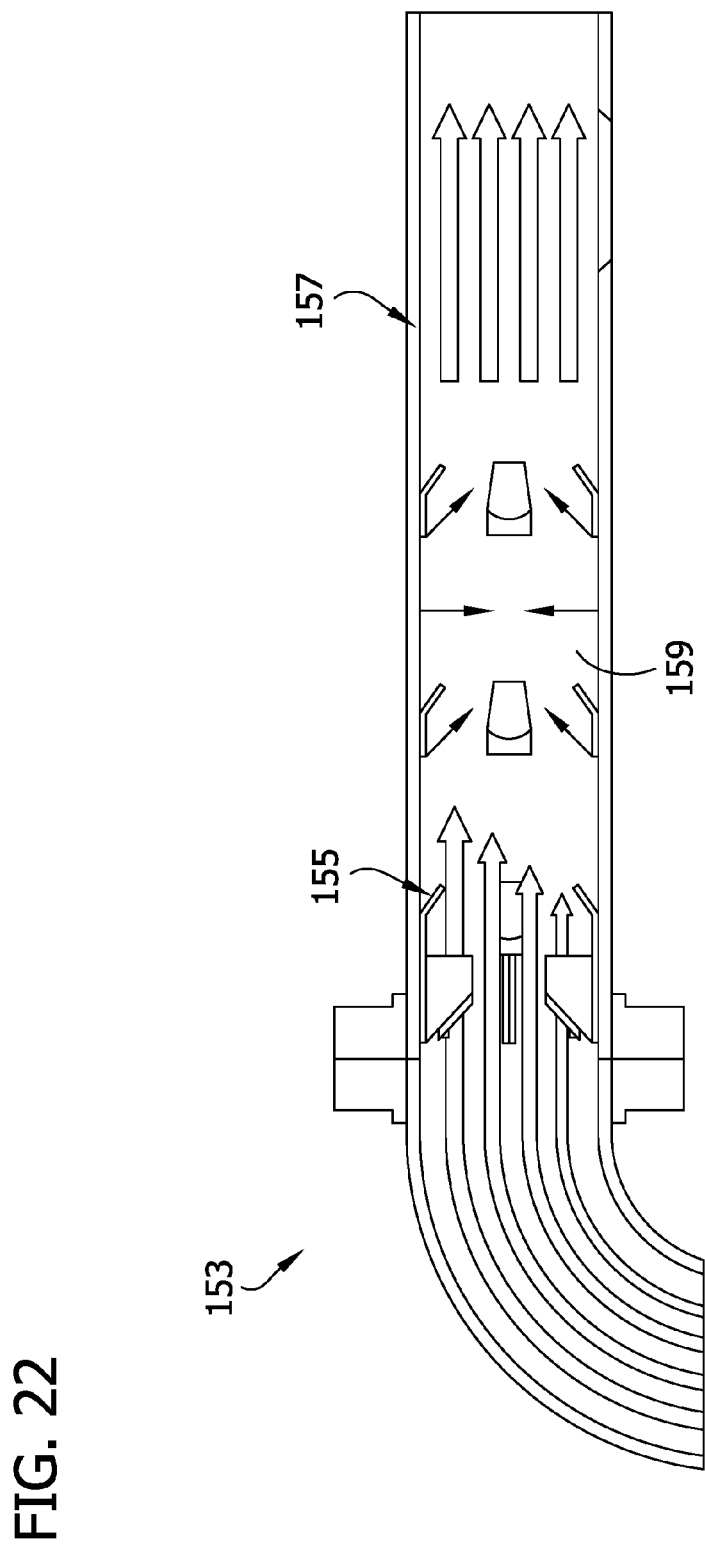
FIG. 22 is a schematic diagram of one embodiment of a flow conditioner in the net oil and gas skid shown in FIGS. 20 and 21.

The net oil and gas skid 121 is configured to maintain a conditioned flow profile as a multiphase fluid flows through the skid. A flow conditioner 153 (FIG. 22) is positioned along the top section of the skid 121 to receive the multiphase fluid flowing through the skid to mix the fluid before it reaches the flowtube of the Coriolis meter 215 and before it reaches the water cut meter 145. As illustrated in FIG. 22, the flow conditioner 153 suitably includes a plurality of tabs 155 projecting inwardly from the wall 157 of a conduit 159 positioned to convey the multiphase fluid through the skid 121. The tabs 155 generate turbulence in the flowing fluid, which results in mixing of the fluid. It is understood that other types of flow conditioners could be used instead of the flow conditioner 153 illustrated in FIG. 22.

The conduit 159 is also configured to have a rise and fall in the skid 121, which tends to disrupt any slip condition developed in the flow. For example, one leg 161 of the conduit 159 extends upwardly and another leg 163 of the conduit extends downwardly. A horizontal section 165 of the conduit connects the upward and downward legs 161, 163 to one another. The rise and fall of fluid as it flows through these segments 161, 163, 165 helps facilitate good mixing of the gas a liquid phases.

The water cut meter 145 is downstream of the Coriolis meter 215. The fluid is also mixed as it flows through the flowtube of the Coriolis meter 215 due to the bends therein. Thus, the Coriolis meter 215 also helps ensure the fluid is sufficiently mixed when it reaches the water cut meter 215.

In the net oil and gas skid 121 illustrated in FIGS. 20 and 21, the Coriolis meter 215 and water cut meter 145 are installed in the downward leg 163 of the conduit 159, which can be desirable to limit the amount of reverse flow through the Coriolis meter 215 and water cut meter 145 (e.g., in cases where slugging conditions are frequently encountered). However, it is understood that it may be desirable to install the Coriolis meter 215 elsewhere in a net oil and gas skid, such as on the upward leg or horizontal leg. Likewise, the water cut meter 145, temperature sensor 147, and pressure sensor 149 can be installed at other locations than those illustrated in FIGS. 21 and 22 if desired.

Figure 23:
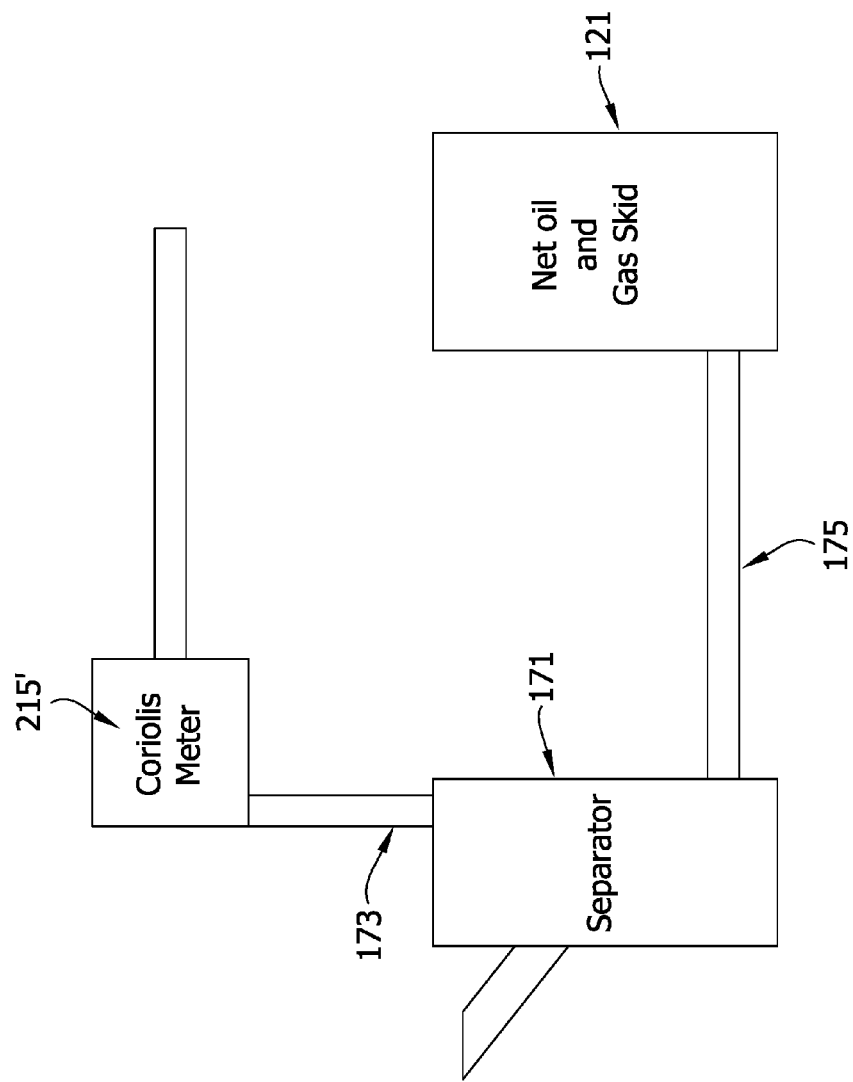
FIG. 23 is a schematic diagram illustrating one embodiment including the net oil and gas skid illustrated in FIGS. 20 and 21 in combination with a compact separation system to facilitate metering fluids with relatively high gas volume fraction (GVF).

The operational range of the net oil and gas skid 121 may be increased for high gas flow, high GVF flows by the inclusion of a compact partial separation system 171 upstream of the skid, as illustrated in FIG. 23. The purpose of the separator is to reduce the quantity of free gas in the liquid stream provided to the Coriolis meter 215 and the other components of the 121. The separator 171 has a gas output 173 and a liquid output 175. The liquid output 175 is directed from the separator 171 to the flowtube of the Coriolis meter 215 and the gas output is diverted from the flowtube to reduce the amount of free gas in the multiphase fluid before it flows through the flowtube. The separator 171 may lack the capacity to achieve complete separation of the gas and liquids, but this is not a problem because the capability of the net oil and gas skid 121 to handle multiphase flow. A separator 171 designed to achieve only partial separation can be advantageous because of its reduced size, cost, and complexity. Thus, in some instances it may be desirable to use a separator 171 that lacks capacity to achieve complete separation.

Another Coriolis meter 215', which may be identical to the Coriolis meter 215 described above is positioned to meter the gas output from the separator 171. It is understood that the gas output 175 can be metered by a different type of meter, including a meter that is not a Coriolis meter if desired. However, it may be desirable in some cases to use a Coriolis meter to meter the gas output 175 from the separator 171 because a control system (not shown) of the separator can monitor the density readings and drive gain of the Coriolis meter to detect any liquid carry-over (i.e., liquid that is undesirably included in the gas output). Short-term occurrences of liquid carry-over are to be expected from time to time, during which the measurement from the system would become invalid if undetected. When these liquid carry-over events are detected (e.g., by monitoring the density readings and drive gain of the Coriolis meter 215'), a SEVA approach, as described in U.S. Pat. No. 5,570,300 (the contents of which are incorporated by reference), can be adopted where the measurement state can be temporarily set to "DAZZLED", and the system output may be replaced by the current test average, or a recent average of known reliable data. The cumulative duration of liquid carry-over events is suitably recorded and reported to the operator so that its impact on the overall test can be taken into consideration.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that several advantages of the aspects of the invention are achieved and other advantageous results attained.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the aspects of the invention by way of example and not by way of limitation. This description enables one skilled in the art to make and use the aspects of the invention, and describes several embodiments, adaptations, variations, alternatives and uses of the aspects of the invention, including what is presently believed to be the best mode of carrying out the aspects of the invention. Additionally, it is to be understood that the aspects of the invention are not limited in application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

Having described aspects of the invention in detail, it will be apparent that modifications and variations are possible without departing from the scope of aspects of the invention as defined in the appended claims. It is contemplated that various changes could be made in the above constructions, products, and process without departing from the scope of aspects of the invention. In the preceding specification, various preferred embodiments have been described with reference to the accompanying drawings. It will, however, be evident that various modifications and changes may be made thereto, and additional embodiments may be implemented, without departing from the broader scope of the aspects of the invention as set forth in the claims that follow. The specification and drawings are accordingly to be regarded in an illustrative rather than restrictive sense.

The Abstract is provided to help the reader quickly ascertain the nature of the technical disclosure. It is submitted with the understanding that it will not be used to interpret or limit the scope or meaning of the claims.

TABLE 1

Nomenclature

| Variable | Description | Units |
|---|---|---|
| $B_o$ | Oil Formation Volume Factor | [dimensionless] |
| $B_w$ | Water Formation Volume Factor | [dimensionless] |
| Corrections | | |
| $C_{de}$ | Coriolis NN correction for total fluid density | Percent % |
| $C_{mf}$ | | Percent % |
| $C_{Rs}$ | Coriolis NN correction for total mass flow | [dimensionless] |
| $C_{Rw}$ | Black oil tuning for dissolved gas in oil | [dimensionless] |
| | Black oil tuning for dissolved gas in water Laboratory fluids with approx. 20% solubility compared to hydrocarbon gas in Vazquez model, are accommodated by setting $C_{Rs} = 0.2$. This tuning factor may be defined as a function of the measured water cut. | |
| GVF | Gas Volume Flow Fraction | Volume % |
| LVF | Liquid Volume Flow Fraction | Volume % |
| $\dot{m}_{phase, conditions}$ | Mass flow rate Phase o oil w water g gas gf gas free go gas in oil gw gas in water l liquid m mixture Conditions sc standard conditions ac actual conditions | kg/s Gas often reported in g/s |
| $\rho_{raw}$ | Mixture raw measured density | kg/m³ |
| $\rho_{drop}$ | Density drop | % |
| $\rho_{phase, conditions}$ | Phase density Phase o oil w water g gas l liquid m mixture Conditions sc standard conditions ac actual conditions | kg/m³ |

TABLE 1-continued

Nomenclature

| Variable | Description | Units |
|---|---|---|
| P | Absolute Pressure of fluid | kPa |
| $P_o$ | Pressure at standard conditions | |
| $Q_{phase, conditions}$ | Volume flow rate Phase o oil w water g gas gf gas free l liquid m mixture Conditions sc standard conditions ac actual conditions | kg/s |
| $R_s$ | Solution gas oil ratio (standard conditions) | m³/m³ |
| $R_w$ | Solution gas water ratio (standard conditions) | m³/m³ |
| T | Temperature of fluid | ° C. or K |
| $T_o$ | Temperature at standard conditions | |
| Time | Time | seconds |
| $W_{out}$ | Water cut - Instrument measurement May be corrected by NN | Vol/Vol % |
| $WT_{Phase}$ | Measured weight of phase over time | kg Gas often reported in g |
| Z | Gas non ideal compressibility factor | |

TABLE 2

Steps in neural network calculations-Immiscible Fluids

| Calculation | Description | Equation |
|---|---|---|
| 1. NN Input | Oil density, ac | $\rho_{o,ac} = f(T, \rho_{o,sc})$ lab polynomial fit |
| 2. | Water density, ac | $\rho_{w,ac} = f(T, \rho_{w,sc})$ lab polynomial fit |
| 3. | Gas density, ac (For this NN, used later) | $\rho_g = \rho_{g,sc} * Z * \left(\dfrac{P_{ac}}{P_o}\right) * \left(\dfrac{T_0}{T_{ac}}\right)$ Z calculated from AGA8 or similar PVT models |
| 4. | Water cut adjustment | $W_{cut} = f(T \ldots )$ lab tuning NN |
| 5. | Liquid density, ac | $\rho_{l,ac} = \rho_{w,ac} * \dfrac{W_{cut}}{100} + \rho_o, ac * \dfrac{(100 - W_{cut})}{100}$ |
| 6. | Density drop | $\rho_{drop} = 100 * \dfrac{(\rho_{l,ac} - \rho_{raw})}{\rho_l}$ |
| 7. NN Target Prep | Reference phase mass flow rates (from total reference measurements) | $\dot{m}_{phase,sc} = \dfrac{WT_{phase}}{\Delta \text{Time}}$ |
| 8. | Reference total mass flow rate | $\dot{m}_m = \dot{m}_{o,sc} + \dot{m}_{w,sc} + \dot{m}_{g,sc}$ |
| 9. | Reference phase volume rates | $Q_{phase,ac} = \dfrac{\dot{m}_{phase,sc}}{\rho_{phase,ac}}$ |

TABLE 2-continued

Steps in neural network calculations-Immiscible Fluids

| Calculation | Description | Equation |
|---|---|---|
| 10. | Reference mixture density, ac | $\rho_{m,ac} = \dfrac{\dot{m}_{m,sc}}{(Q_{o,ac} + Q_{w,ac} + Q_{g,ac})}$ |
| 11. NN Target | NN density correction target | $C_{ds,target} = 100 * \dfrac{\rho_{m,ac}}{\rho_{raw}}$ |
| 12. NN Targets | NN mass flow correction target | $C_{mf,target} = 100 * \dfrac{\dot{m}_{m,sc}}{\dot{m}_{raw}}$ |
| 13. NN Corrections | NN density correction | $C_{de} = f(\dot{m}_{raw}, \rho_{drop}, W_{cut})$ |
| 14. | NN mass flow correction | $C_{mf} = f(\dot{m}_{raw}, \rho_{drop}, W_{cut})$ |
| 15. Rate Calculations | Mixture density, ac | $\rho_{m,ac} = \dfrac{C_{ds} * \rho_{raw}}{100}$ |
| 16. | Mixture mass flow rate | $\dot{m}_m = \dfrac{C_{mf} * \dot{m}_{raw}}{100}$ |
| 17. | Mixture volume flow rate, ac | $Q_{m,ac} = \dfrac{\dot{m}_m}{\rho_{m,ac}}$ |
| 18. | Liquid volume fraction, ac | $LVF = \dfrac{(\rho_{m,ac} - \rho_{g,ac})}{(\rho_{l,ac} - \rho_{g,ac})}$ |
| 19. | Oil mass flow rate | $\dot{m}_{g,ac} = \dfrac{(100 - W_{cut})}{100} * LVF * Q_{m,ac} * \rho_{o,ac}$ |
| 20. | Water mass flow rate | $\dot{m}_{w,ac} = \dfrac{W_{cut}}{100} * LVF * Q_{m,ac} * \rho_{w,ac}$ |
| 21. | Gas mass flow rate | $\dot{m}_{g,ac} = (1 - LVF) * Q_{m,ac} * \rho_{g,ac}$ |

TABLE 3

Steps in neural network calculations-miscible fluids

| Calculation | Description | Equation |
|---|---|---|
| 1. NN Input | Oil density, ac (no dissolved gas) | $\rho_{o,ac} = f(T, \rho_{o,sc})$ lab polynomial fit |
| 2. | Water density, ac (no dissolved gas) | $\rho_{w,ac} = f(T, \rho_{w,sc})$ lab polynomial fit |
| 3. | Gas density, ac (For this NN, used later) | $\rho_g = \rho_{g,sc} * Z * \left(\dfrac{P_{ac}}{P_o}\right) * \left(\dfrac{T_0}{T_{ac}}\right)$ Z calculated from AGA or similar PVT model |
| 4. | Water cut adjustment | Wcut = f(T ... ) lab tuning NN |
| 5. | Liquid density, ac (no dissolved gas) | $\rho_{l,ac} = \rho_{w,ac} * \dfrac{W_{cut}}{100} + \rho_o * \dfrac{(100 - W_{cut})}{100}$ |
| 6. | Density drop | $\rho_{drop} = 100 * \dfrac{(\rho_{l,ac} - \rho_{raw})}{\rho_l}$ |
| 7. NN Target Prep | Reference phase mass flow rates (from total reference measurements) | $\dot{m}_{phase,sc} = \dfrac{WT_{phase}}{\Delta\,Time}$ |
| 8. | Reference total mass flow rate | $\dot{m}_m = \dot{m}_{o,sc} + \dot{m}_{w,sc} + \dot{m}_{g,sc}$ |
| 9. | Reference phase volume rates at sc | $Q_{phase,sc} = \dfrac{\dot{m}_{phase,sc}}{\rho_{phase,sc}}$ |
| 10. | Reference Gas oil ratio | $GOR = \dfrac{Q_{g,sc}}{Q_{o,sc}}$ |
| 11 | Black oil Parameters $R_s$ Solution gas oil ratio $B_o$ Oil formation volume factor $R_w$ Solution gas water ratio $B_w$ Water formation volume factor (see Table 4 for example calculations) | $R_s = C_{rs} * f(\rho_{g,sc}, \rho_{o,sc}, P, T)$ $B_o = f(R_s, \rho_{g,sc}, \rho_{o,sc}, T)$ $R_w = C_{rw} * f(\rho_{g,sc}, \rho_{w,sc}, P, T)$ $B_w = f(R_w, \rho_{g,sc}, \rho_{w,sc}, T)$ |
| 12. | Gas rates in each phase Volume basis mode is relative to sc Convert to actual mass rates | $Q_{go,sc} = R_s * Q_{o,sc}$ $Q_{gw,sc} = R_w * Q_{o,sc}$ $Q_{gfree,sc} = Q_{g,sc} - Q_{go,sc} - Q_{gw,sc}$ $\dot{m}_{go,ac} = Q_{go,sc} * \rho_{g,sc}$ $\dot{m}_{gw,ac} = Q_{gw,sc} * \rho_{g,sc}$ $\dot{m}_{gfree,ac} = \dot{m}_g - \dot{m}_{go,ac} - \dot{m}_{w,ac}$ |
| 13. | Free gas training check | If $\dot{m}_{gfree,ac} < 0$ - Undersaturated If under saturated ... Gas flow rate range from 0-saturation gas Apply model of degree of undersaturation or eliminate point from NN modelling process. |
| 14. | Phase volume flow rate, ac | $Q_{o,ac} = B_o * Q_{o,sc}$ $Q_{w,ac} = B_w * Q_{w,sc}$ $Q_{gfree,ac} = \dfrac{\dot{m}_{gfree,ac}}{\rho_{g,ac}}$ |
| 15. | Reference Mixture density, ac | $\rho_{m,ac} = \dfrac{\dot{m}_{m,sc}}{(Q_{o,ac} + Q_{w,ac} + Q_{gfree,ac})}$ |
| 16. NN Target | NN density correction target | $C_{ds,target} = 100 * \dfrac{\rho_{m,ac}}{\rho_{raw}}$ |
| 17. NN Target | NN mass flow correction target | $C_{mf,target} = 100 * \dfrac{\dot{m}_{m,sc}}{\dot{m}_{raw}}$ |

TABLE 3-continued

Steps in neural network calculations-miscible fluids

| | Calculation | Description | Equation |
|---|---|---|---|
| 18. | NN Corrections | NN density correction | $C_{ds} = f(\dot{m}_{raw}, \rho_{drop}, W_{cut})$ |
| 19. | | NN mass flow correction | $C_{mf} = f(\dot{m}_{raw}, \rho_{drop}, W_{cut})$ |
| 20. | | Mixture density, ac | $\rho_{m,ac} = \dfrac{C_{ds} * \rho_{raw}}{100}$ |
| 21. | | Mixture mass flow rate | $\dot{m}_m = \dfrac{C_{mf} * \dot{m}_{raw}}{100}$ |
| 22. | | Mixture volume flow rate, ac | $Q_{m,ac} = \dfrac{\dot{m}_m}{\rho_{m,ac}}$ |
| 23. | | Black oil Parameters $R_s, B_o, R_w, B_w$ | Refer to equations in step 11 |
| 24. | | Phase density, ac | $\rho_{o,ac} = \dfrac{\rho_{o,sc}}{B_o}$ $\rho_{w,ac} = \dfrac{\rho_{w,sc}}{B_w}$ $\rho_{l,ac} = \rho_{w,ac} * \dfrac{W_{cut}}{100} + \rho_{o,ac} * \dfrac{(100 - W_{cut})}{100}$ $\rho_g = \rho_{g,sc} * Z * \left(\dfrac{P_{ac}}{P_o}\right) * \left(\dfrac{T_o}{T_{ac}}\right)$ |
| 25. | | Liquid volume fraction, ac | $LVF = \dfrac{(\rho_{m,ac} - \rho_{g,ac})}{(\rho_{l,ac} - \rho_{g,ac})}$ |
| 26. | | Phase volume flow rate, ac | $Q_{o,ac} = \dfrac{(100 - W_{cut})}{100} * LVF * Q_{m,ac}$ $Q_{w,ac} = \dfrac{W_{cut}}{100} * LVF * Q_{m,ac}$ $Q_{gfree,ac} = (1 - LVF) * Q_{m,ac}$ |
| 27. | | Gas rates in each phase | See Step 12 |
| 28. | | Free gas measurement check | If Gain < GainTol – Undersaturated Recommended GainTol 2X water default for tube If under saturated . . . Gas flow rate range from 0-saturation gas Liquid density based on user GOR if given. If not given, single phase correlation used No comparison to lab data for gas rates Report options for gas rate . . . User GOR for gas rate at sc N/A or < Saturated value or 2-4 region estimates based on gain |
| 29. | | Phase mass flow rate, sc These are compared to reference data | $\dot{m}_{o,sc} = \dot{m}_{o,ac} - \dot{m}_{go,ac}$ $\dot{m}_{w,sc} = \dot{m}_{w,ac} - \dot{m}_{gw,ac}$ $\dot{m}_{g,sc} = \dot{m}_{g,ac} + \dot{m}_{go,ac} + \dot{m}_{w,ac}$ |
| 30. | | Phase volume flow rate, sc For reporting | Step 9, but accounting for dissolved gas, and validated external gas measurement $Q_{phase,sc} = \dfrac{\dot{m}_{phase,sc}}{\rho_{phase,sc}}$ |

TABLE 4

Example calculations for laboratory trials:

| | |
|---|---|
| Std. Oil density at 60° F. | 814.6 kg/m3 |
| Std. Gas density at 60° F., 101.325 kPa abs. | 1.223 kg/m3 |
| Actual Pressure | 400.0 kPa |
| Actual Temperature | 40.0 ° C. |
| Tuning constant for gas in oil CRs | 0.20 |
| Calculated actual Oil Rs | 0.408 |
| Calculated gas saturated Oil Bo | 1.029 |
| Calculated actual gas saturated Oil density | 791.7 kg/m3 |
| Assume known true Oil mass flow rate | 4.0 kg/s |
| Oil std. volume flow rate | 0.004911 m3/s |
| Calc. saturated gas std. volume flow | 0.002002 m3/s |
| Calc. saturated gas mass flow | 2.448 g/s |
| Now, ignoring negligible dissolved gas in water | |
| Assume known true Water mass flow rate | 1.0 kg/s |
| Actual water density, calc. at line temperature | 994.2 kg/m3 |
| Calc. Liquid volume flow rate | 0.006059 m3/s |
| Calc. Water Cut (actual volumetric flow ratio) | 16.6 % |
| Calc. Liquid density | 825.3 kg/m3 |
| Assume known true Gas mass flow rate | 6.0 g/s |
| Free Gas mass flow rate | 3.552 g/s |
| Free Gas density, calc. at line pressure and temperature | 4.4 kg/m3 |
| Free Gas volume flow rate | 0.000798 m3/s |
| Calc. Free Gas GVF | 11.7 % |
| Calc. mixture density | 732.0 kg/m3 |
| Calc. density drop | 11.6 % |
| For comparison, assuming no dissolved gas, the following would have been calculated | |
| Oil density | 797.5 kg/m3 |
| Liquid volume flow | 0.006022 m3/s |
| Water Cut | 16.7 % |
| Liquid density | 830.3 kg/m3 |
| Gas volume flow | 0.001348 m3/s |
| 'nominal GVF' | 18.3 % |
| Mixture density | 679.2 kg/m3 |
| Density drop | 18.2 % |

The invention claimed is:

1. A system for metering flow of a multiphase fluid, the system comprising:
   a vibratable flowtube for receiving the multiphase fluid flow;
   a driver configured to vibrate the flowtube;
   a pair of sensors configured to detect movement of the flowtube at different locations on the flowtube and output sensor signals indicative of the detected movement;
   a pressure sensor configured to measure a pressure of the multiphase fluid;
   a temperature sensor configured to measure a temperature of the multiphase fluid; and
   one or more processors configured to receive the sensor signals from the pair of sensors configured to detect movement of the flowtube, determine a phase difference between the sensor signals from the pair of sensors configured to detect movement of the flowtube, and use the determined phase difference to determine a fluid flow rate through the flowtube, wherein said one or more processors are further configured to:

receive a signal from the pressure sensor indicative of the pressure of the multiphase fluid in the flowtube;

receive a signal from the temperature sensor indicative of the temperature of the multiphase fluid in the flowtube;

receive a signal from a meter indicative of relative amounts of multiple different liquids in the multiphase fluid; and determine an amount of dissolved gas in the multiphase fluid using the pressure, the temperature, and the relative amounts of the multiple liquids in the multiphase fluid.

2. A system as set forth in claim 1 wherein said one or more processors are configured to determine the fluid flow rate by using a mapping between a plurality of inputs and at least one output related to the fluid flow rate, wherein the inputs comprise a raw mass fluid flow rate, pressure of the fluid, temperature of the fluid, and the relative amounts of the multiple liquids in the multiphase fluid and wherein said one or more processors are configured to determine the amount of dissolved gas according to a gas solubility model.

3. A system as set forth in claim 2 wherein the solubility model includes an adjustable tuning factor.

4. A system as set forth in claim 1 wherein said one or more processors are configured to determine an amount of free gas in the multiphase fluid.

5. A system as set forth in claim 4 wherein said one or more processors are configured to determine an amount of total gas in the multiphase fluid using the amounts determined for dissolved gas and free gas.

6. A system as set forth in claim 1 further comprising a flow conditioner configured to mix the multiphase fluid before it enters the flowtube.

7. A system as set forth in claim 6 wherein the flow conditioner comprises a plurality of tabs projecting inwardly from a wall of a conduit that is positioned to convey the multiphase fluid to the flowtube.

8. A system as set forth in claim 1 further comprising a conduit upstream of the flow tube and connected to the flowtube for conveying the multiphase fluid to the flowtube, the conduit being configured to have two substantially vertical segments and a substantially horizontal segment between the substantially vertical segments.

9. A system as set forth in claim 8 wherein one of the substantially vertical segments is between the substantially horizontal segment and the flowtube, wherein the flowtube is at a lower elevation than the substantially horizontal segment.

10. A system as set forth in claim 8 wherein the substantially horizontal segment is connected to each of the substantially vertical segments at upper ends of the substantially vertical segments.

11. A system as set forth in claim 1 further comprising a separator upstream of the flowtube and configured for separating at least some free gas in the multiphase fluid from the liquid phase, the separator having a gas output and a liquid output, wherein the liquid output is directed from the separator to the flowtube and the gas output is diverted from the flowtube to reduce the amount of free gas in the multiphase fluid before it flows through the flowtube.

12. A system as set forth in claim 1 wherein the multiple different liquids include water and oil and wherein said meter comprises a water cut meter.

* * * * *